United States Patent [19]

Lo et al.

[11] 3,960,563

[45] June 1, 1976

[54] METHODS AND APPARATUS FOR TAKING AND COMPOSING STEREOSCOPIC PICTURES

[75] Inventors: Allen Kwok Wah Lo, Atlanta; Jerry Curtis Nims, Dunwoody, both of Ga.

[73] Assignee: Dimensional Development Corporation, Atlanta, Ga.

[22] Filed: Sept. 24, 1974

[21] Appl. No.: 508,810

Related U.S. Application Data

[63] Continuation-in-part of Ser. No. 398,990, Sept. 20, 1973, abandoned, which is a continuation-in-part of Ser. No. 292,796, Sept. 27, 1972, abandoned.

[52] U.S. Cl. .................................. 96/40; 350/131; 352/43; 352/86; 352/58; 354/114; 354/294; 355/22
[51] Int. Cl.² .......................................... G03C 9/00
[58] Field of Search ............ 96/40, 42, 41; 354/112, 354/293, 114, 294, 123; 352/43, 81, 58, 86; 355/22, 52, 40, 77, 46; 350/130, 131; 248/178

[56] References Cited
UNITED STATES PATENTS

| | | | |
|---|---|---|---|
| 765,980 | 7/1904 | Mercier .................. | 354/293 |
| 2,860,562 | 11/1958 | Swift ....................... | 354/294 |
| 3,380,360 | 4/1968 | Stockbridge et al. ........ | 354/112 |
| 3,482,913 | 12/1969 | Glenn ..................... | 355/33 |
| 3,508,920 | 4/1970 | Glenn ..................... | 96/40 |

Primary Examiner—William A. Powell
Assistant Examiner—J. J. Gallagher
Attorney, Agent, or Firm—Brumbaugh, Graves, Donohue & Raymond

[57] ABSTRACT

Methods and apparatus for aiding a photographer in determining, coordinating and adjusting numerous variables which bear on the quality of a stereoscopic picture employing a lenticular screen. The variables may include, depending upon the photographic method employed and the scene to be photographed, the desired size of the stereoscopic picture, the resolving power and lenticule width of the lenticular screen, the number and size of two-dimensional picture negatives which are taken and included in the stereoscopic picture, the distance between adjacent camera vantage points from which the negatives are taken, the camera focal length, the distance from the camera to the nearest element or object of the photographed scene, the distance from the camera to the farthest element or object of the scene, and the distance from the camera to an element or object — the "key subject matter" — in the scene which is to lie in the plane of the stereoscopic picture.

According to the invention, the valve of parallax between the images of elements of the photographed scene is determined and controlled so that these images will be clear and sharply focused in the stereoscopic picture. This is accomplished by a method of taking pictures and a method of taking and composing pictures which cause the parallax value to fall within a prescribed range.

In one apparatus embodiment of the invention a camera support is provided which permits a single camera to take successive two-dimensional pictures of the same scene from different points. In another apparatus embodiment of the invention a camera is provided to take a plurality of pictures, either simultaneously or successively, through separate lenses.

31 Claims, 25 Drawing Figures

METHODS AND APPARATUS FOR TAKING AND COMPOSING STEREOSCOPIC PICTURES

REFERENCE TO RELATED APPLICATION

This application is a continuation-in-part of U.S. application Ser. No. 398,990, filed Sept. 20, 1973 now abandoned, which is a continuation-in-part of U.S. application Ser. No. 292,796, filed Sept. 27, 1972 now abandoned.

BACKGROUND OF THE INVENTION

The present invention relates to the production of stereoscopic pictures of the type employing a lenticular screen.

A well-known technique for producing a stereoscopic picture of a given scene is to photograph the scene a number of times from different vantage points or angles with respect to the elements or objects in the scene. Normally, the successive picture-taking vantage points all have the same vertical elevation and are spaced apart horizontally at equal intervals either along a straight line or the arc of a circle.

It is also known to photograph the scene a number of times from a single vantage point and to translate or rotate the scene relative to the photographic position for each successive picture. The latter technique is entirely analogous to the former one since the relative positions of camera and scene are varied in the identical manner.

There are essentially two methods whereby the photographic images for a stereoscopic picture are caused to be registered on a film or plate behind a lenticular screen: these are the so-called "direct" and the "indirect" methods. In the direct method a lenticular screen is arranged in the camera immediately in front of the photographic negative. After each exposure of the negative (if separate pictures are taken at different relative positions of the camera and scene) or during exposure of the negative if the relative positions of camera and scene are continuously changed while a single time-exposure is taken), the lenticular screen is moved laterally with respect to the negative or the negative and screen are moved together in the same direction as the camera (if lenticular film is used), so as to maintain successive images of the so-called "key subject matter" of the scene in registry with a selected point on the lenticular screen. After the negative has been fully exposed, it is removed from the camera and developed in the normal way to produce a print or transparency. Finally, another lenticular screen (assuming lenticular film is not employed) is superimposed in proper registry on the print or transparency to complete the stereoscopic picture.

One technique for producing pictures according to the "direct" or in-camera method is fully described, for example, in the U.S. Pat. No. 3,380,360 to Stockbridge, et al.

With the "indirect" method of taking pictures a lenticular screen is not used in the camera and a separate negative is exposed at each different relative position of the camera and scene.

After exposure, the negatives are developed and successively projected and imaged by an enlarger upon photosensitive film which is overlaid with a lenticular screen. The negatives are so projected that the successive narrowed image bands, which are focused on the film by the lenticular screen, lie adjacent to one another on the film. This technique of successive imaging is known in the art as "composing" the stereoscopic picture.

Thereafter the photosensitive film is developed and the same or an identical lenticular screen to that used for composing is properly registered with the composite image to present a stereoscopic picture to the viewer.

Important and useful improvements in the foregoing composing technique, as applied to the indirect photographic method, are described in the copending commonly-owned U.S. patent application Ser. No. 379,388, filed July 16, 1973, by Jerry C. Nims and Allen K. Lo, now U.S. Pat. No. 3,895,867 which copending application is a continuation-in-part of application Ser. No. 171,269 filed Aug. 12, 1971, now abandoned.

In order to obtain photographic negatives, whether by the direct or indirect photographic method, the photographer may adjust one or more of a large number of variables within his immediate control. These variables include such knowns and unkowns as the desired size of the stereoscopic picture to be produced, the resolving power and lenticule width of the lenticular screen, the number and size of two-dimensional picture negatives which are to be taken and included in the stereoscopic picture, the distance between adjacent camera vantage points from which the negatives are taken, the camera focal length, the distance from the camera to the nearest element or object of the scene to be photographed, the distance from the camera to the farthest element or object of the scene to be photographed, and the distance from the camera to an element or object — the "key subject matter" — in the scene which is to lie in the plane of the picture. Not only is the coordination of these numerous variables an extremely difficult task for a photographer in the field, but it has not previously been known how these variables may be adjusted so that the resulting stereoscopic pictures will be of consistently high quality.

SUMMARY OF THE INVENTION

It is therefore an object of the present invention to provide methods and apparatus for aiding the photographer in determining, coordinating and adjusting the numerous variables which bear on the quality of a stereoscopic picture in a manner permitting the consistent production of high quality stereoscopic pictures under substantially all photographic conditions.

This object, as well as other objects which will become apparent in the discussion that follows, is achieved, according to the present invention, by maintaining the parallax imparted to the final stereoscopic pictures within certain minimum and maximum values, and preferably at an optimum value. This procedure, as will be explained in detail hereinafter involves a function of the lenticule width of the lenticular screen of the stereoscopic picture, the enlargement ratio between the size of the two-dimensional negative or negatives taken by the camera to the size of the final stereoscopic picture, the composition and contrast of the photographed scene, and the number (or the effective number) of exposures made of the scene and to be included in the picture.

Given the appropriate parallax, the remaining relevant variables which must be determined in taking and composing a stereoscopic picture may be coordinated in a manner which will be derived and set forth hereinafter. Conversely, it is possible to start with the photographic variables and determine whether the parallax associated with those variables falls within the permissible range for proper picture quality. This latter aspect also allows control of the parallax of the stereoscopic picture during the composing process when the indirect method is used.

Before the present invention is more particularly described, it is necessary to define a number of terms which will be used throughout this specification in connection with the inventive process of taking an appropriate negative or negatives for use in a stereoscopic picture. In the typical photographic arrangement, whether the photographic conditions be characterizable as close-up or telescopic photography, macrophotography, micro-photography, radiography, etc., a photographic camera must make an "image record" of an "object field" at a plurality of "vantage points". The image record, as the term is used hereinafter, is intended to include either a single three-dimensional (lineiform) negative if the direct method of stereoscopic photography is employed, or a plurality of two-dimensional negatives if the indirect method is employed. The object field, as used hereinafter, is intended to define the scene to be photographed. The term "object field" is used rather than "scene" since, for example, in X-ray photography and microphotography, the object field may constitute subject matter such as a single object alone. Also, it is desirable in certain photographic conditions, such as electron microphotography and X-ray photography, to make the image record of the object field from an image intensifier screen or the like. The "object field", in such conditions, is the object undergoing examination, not the intensifier screen, which merely presents a projected image of the object field.

When taking an image record of the object field, the camera is situated at a plurality of "vantage points", or positions relative to the object field. The term vantage points, as used hereinafter, is intended to include the case where the object field is moved relative to the camera as well as the converse situation. Successive vantage points define a line or "path" which may be either a straight line or the arc of a circle. For example, if the camera is provided with a plurality of lenses and is operable to take a plurality of two-dimensional negatives simultaneously, the path of the vantage points is defined by the camera itself. However, where a single lens camera is used (either with the direct or indirect method) to take successive pictures at a plurality of vantage points, the movement of the camera normally follows the path of the vantage points.

The path of the vantage points in the photographic arrangement is spaced from a point or plane in the object field which is to lie in the plane of the stereoscopic picture. This plane, which contains the "key subject matter" of the object field, will be hereinafter denoted as the "object field plane."

For the purposes of the present invention, it is necessary to define three points or "elements" in the object field; namely, a "nearest foreground element", which is that foreground element closest to the path of the vantage points that is to appear in focus and sharp in the final stereoscopic picture; a "farthest background element", which is the background element farthest from the path of the vantage points that is to appear in focus and sharp in the final stereoscopic picture; and an element of the key subject matter which is located at an intermediate position in the object field. If the stereoscopic picture is to have both foreground and background it will include a foreground plane that is parallel to the object field plane and passes through the foreground element and a background plane that is parallel to the object field plane and passes through the background element. If the stereoscopic picture is to have only a foreground (without a background) or a background (without a foreground) the background element and plane or the foreground element and plane, respectively, are eliminated.

Foreground elements and background elements other than the "nearest foreground element" and the "farthest background element", respectively, may of course be included in a picture. In accordance with the invention, those foreground and background elements lying closer to the key subject matter than the corresponding "nearest" and "farthest" elements will appear focused and sharp in the final picture, while those spaced beyond the "nearest" or "farthest" elements will be blurred. For artistic or other reasons, however, it may be desirable in some circumstances to include such blurred images. One example of such a situation would be where a comparatively small or unimportant object is located in front of the foreground elements of principal interest, or behind the background elements of principal interest. In this case, the quality (sharpness and focus) of the images of the principal foreground elements or of the principal background elements is of primary importance, and not that of the unimportant foreground element or background element even though that element is more distantly spaced from the key subject matter element. For purposes of the invention, therefore, the "nearest foreground element" in this example would be the principal foreground element spaced closest to the path of the vantage points, and the "farthest background element" would be the principal background element spaced farthest from the path of the vantage points.

Finally, it is necessary to define the term "principal axis" of the object field. Generally, this axis is a line drawn through the center of the object field perpendicular to the object field plane. In the usual case, it will also pass through the central vantage point. Since the object field plane is parallel to both the foreground and background plane, the principal axis will also be perpendicular to these two planes. In some cases, though not necessarily, the principal axis will pass through one or more of the nearest foreground element, the key subject matter element and the farthest background element.

As was mentioned above, the image record for a stereoscopic picture must be taken at a plurality of vantage points. In a stereoscopic picture utilizing a lenticular screen, each separate view from each separate vantage point produces a separate lineiform image beneath each lenticule of the final picture. Hence, within the resolution limit of the lenticular screen, the greater the number of pictures taken at different vantage points, the higher will be the quality of the stereoscopic picture.

It will be understood, however, that when the indirect method is used, all of the two-dimensional negatives that are taken may not be used in composing the final picture. In fact, it is a feature of the present invention to provide a method whereby the parallax in the final stereoscopic picture may be controlled by limiting the number of negatives used in the composing process.

Thus, with the indirect method the number of vantage points at which two-dimensional negatives are taken may not be equal to the number of negatives used to compose the stereoscopic picture. However, for consistency between the direct and indirect methods, those vantage points at which are taken negatives not used in the final stereoscopic picture will be ignored. Consequently, the number (N) of vantage points is hereby defined to be the number of those vantage points at which an image record is made that is utilized in the stereoscopic picture.

Both methods and apparatus are provided, in accordance with the present invention, for taking and composing stereoscopic pictures of consistently high quality. In one feature of the invention, there is provided a method for obtaining an image record of an object field by photographing the object field from a plurality of vantage points while controlling those variables which affect the change, between adjacent vantage points, in the parallax value between the image of the key subject matter element of the picture and the image of either the foreground or background element, or both, as recorded at each of the adjacent vantage points.

The maximum permissible change in parallax value between adjacent vantage points, as will be explained and derived hereinafter, is made substantially equal to $cW/R$, where $c$ is selected from the range 1.0 to 5.0, inclusive, for lenticule widths greater than approximately 5.0 mils, and from the range of from 1.0 to 10.0, inclusive, for lenticule widths of approximately 5.0 mils or less, as a function of photographic conditions.

The variables which bear upon the change in parallax value between adjacent vantage points are:

1. the focal length (f) of the camera;
2. the distance between adjacent ones of the plurality of vantage points;
3. the enlargement ratio (R) between the final stereoscopic picture and the photographic record of the object field;
4. the distance (a) from the path of the vantage points to the nearest foreground element of the object field;
5. the distance (b) from the path of the vantage points to the farthest background element of the object field;
6. the distance (k) from the path of the vantage points to the key subject matter element of the object field;
7. the lenticule width (W) of the lenticular screen of the stereoscopic picture; and
8. the number (N) of vantage points at which negatives are taken (which negatives are used to compose the stereoscopic picture).

As mentioned above, the number (N) of vantage points which are used to produce the image record may be controlled, with the indirect method, during the composing process. Consequently, in another feature of the present invention, a method is provided for producing a stereoscopic picture which includes the steps of photographing an object field at a plurality of vantage points to obtain a plurality of negatives, and exposing a photosensitive surface by projecting the object field image on each negative through a lenticular screen to compose the stereoscopic picture while controlling those variables defined above, in the manner defined above, that bear upon the change between adjacent vantage points in the parallax value between the image of the key subject matter element and the image of the foreground or background element, or both, of the object field as projected through the lenticular screen.

According to a further feature of the invention, there is provided apparatus for aiding a photographer in carrying out the indirect method of producing a stereoscopic picture in accordance with the principles of the present invention.

In one preferred embodiment, a camera is provided for simultaneously exposing a plurality of two-dimensional negatives. The camera includes a camera housing for holding the plurality of negatives during exposure and a corresponding plurality of lenses mounted in the housing for transmitting and focusing images of the object field on the separate negatives. According to the invention, the focal length of all the lenses and the spacing between the optical axes of adjacent lenses is made a function of the lenticule width of the lenticular screen of the stereoscopic picture.

In another preferred embodiment of apparatus according to the present invention, there is provided a support assembly for a single-lens camera which permits a plurality of two-dimensional negatives to be successively exposed by a conventional camera in accordance with the principles of the present invention. This camera support assembly essentially comprises a base or support arranged to be disposed in parallel to the object field plane, a slide which is movably carried by the base for positioning a camera at selected points along the length of the base, and means for accurately positioning the slide along the length of the base to determine the relative spacing between the vantage points at which the negatives are exposed.

BRIEF DESCRIPTION OF THE DRAWINGS

FIGS. 19A and 19B are composite views illustrating the scale layout of another form of the camera support assembly illustrated in FIG. 14.

DETAILED DESCRIPTION OF THE INVENTION

THEORETICAL EXPLANATION

The quality of a stereoscopic picture is directly related to the amount of parallax, which, as will be explained in detail below, is the apparent shift in position of an element of an object field due to the relative change in position of the element and/or the place from where the element is viewed. Thus, when the parallax value in a finished stereoscopic picture is small, the image of the photographed object or objects in the picture look flat and lack depth. In contrast, when the parallax value is large, the image of the photographed object or objects appear blurred and out of focus since different portions of the image interfere with each other.

Although for somewhat different reasons, variations in parallax have essentially the same effect on human vision. When a remote object is viewed and the parallax is small, depth and separation — the so-called "three-dimensional effect" — is lacking. When the object viewed is very close to the eyes, however, and the parallax value is large, it is difficult to see a solid image of that object.

In an ideal stereoscopic picture with perfect three-dimensional effect, all elements of the photographed object field should be totally in focus and sharp. In order to approach such an ideal, it is necessary to establish a range of permissable parallax values. In addition, it is necessary to control the photographic variables so that the proper parallax value will be obtained under each photographic condition, be such condition characterizable as close-up or telescopic photography, macro-photography, micro-photography or X-ray photography.

The phenomenon of parallax may be observed either when viewing a single element of an object field from two or more vantage points or when viewing two or more elements from a single vantage point. In the former case, parallax may be defined as the apparent displacement or the difference in apparent direction of one element as seen from different vantage points not on a straight line with the element. In the latter case, the parallax is the apparent displacement or difference in apparent direction of the several elements as seen from a single vantage point not on a straight line with the elements. These two types of parallax are illustrated in FIG. 1A.

Figure 1A:
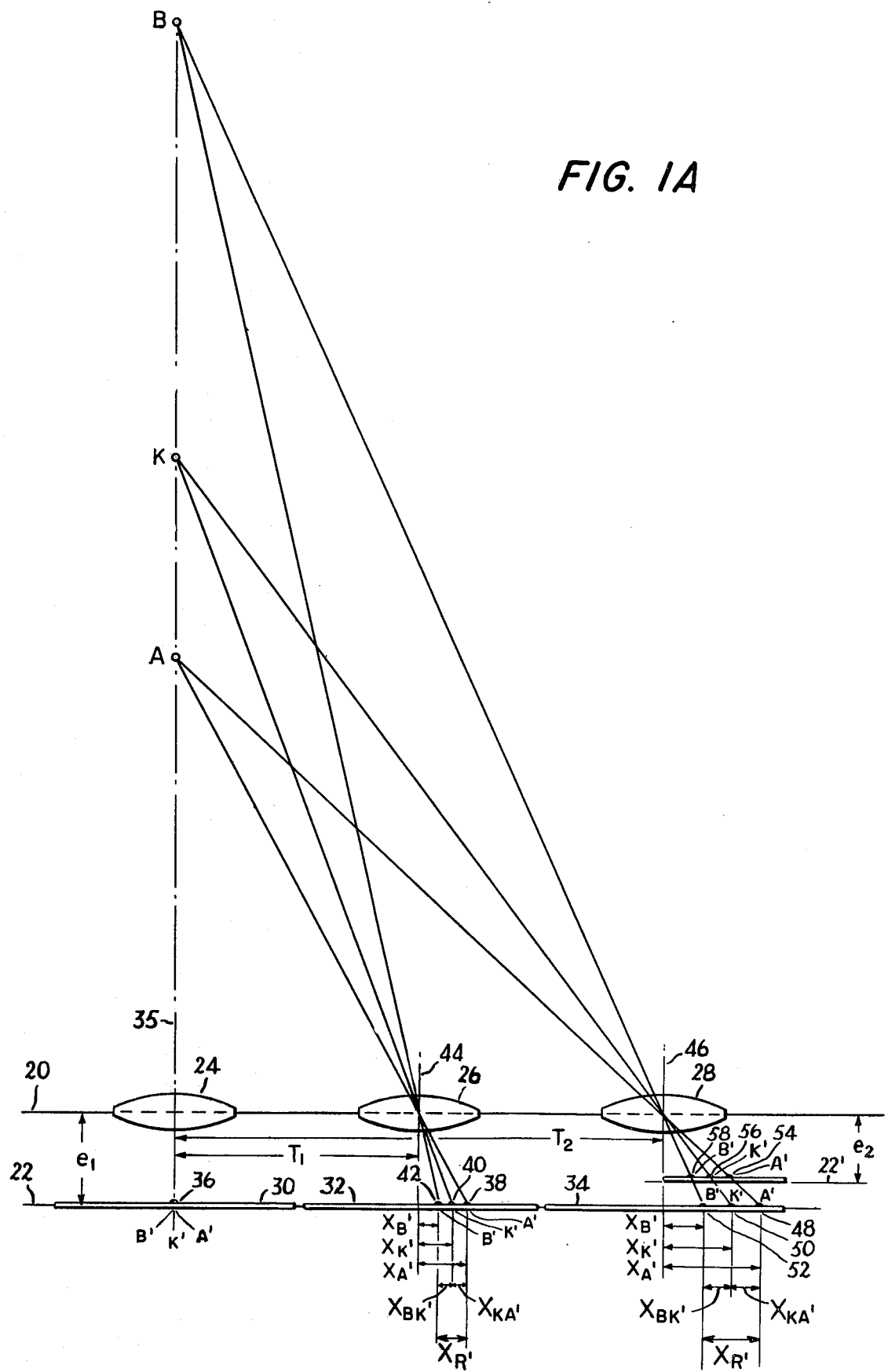
FIG. 1A is a diagrammatic view showing three object field element positions and three different photographic vantage points for making photographic exposures of an object field in accordance with the principles of the invention.

FIG. 1A is a plan view showing three element positions A, K and B, a camera objective plane 20 and a focal plane 22. An element of the object field at position A is intended to be the "nearest foreground element" to be photographed. This element, when its image is viewed in the stereoscopic picture, would appear to be closer to the viewer than the plane of the picture. An element at position B is intended to be the "farthest background element" to be photographed. The image of this element in the stereoscopic picture would appear to the viewer to lie in back of the plane of the picture. An element at position K is intended to be the so-called "key subject matter" in the object field. The image of this element in the stereoscopic picture would appear to lie in the plane of the picture.

Three photographic camera lenses 24, 26 and 28 are shown in FIG. 1A oriented along the camera objective plane 20 with their respective axes perpendicular to this plane. These lenses respectively focus images of the object field to be photographed on suitable photographic negative film 30, 32 and 34 oriented in the focal plane 22.

As will be understood from the laws of optics, the object field elements at positions A, K and B will all be imaged at a common point 36 by the lens 24. This point will lie on a common axis with the element positions A, K and B which is the axis 35 of the lens 24. This axis, which has been defined above as the "principal axis" of the object field, has been illustrated as intersecting the element positions A, B and K for simplicity and clarity in describing the invention. It will be understood that the points A, K and B need not lie in a straight line and that, generally, the principal axis of the object field may be taken as the line which passes through the center of the field.

Object field elements at positions A, K and B are focused by the lens 26 at the positions 38, 40 and 42, respectively, on the photographic negative 32. Because the optical axis 44 of the lens 26 is displaced by an amount "$T_1$", from the principal axis of the object field, the respective positions of points 38, 40 and 42 will be displaced from each other and from the optical axis 44. The amount of this displacement is the value of parallax which will hereinafter be designated by symbol "X".

As indicated in FIG. 1A, there is parallax $X_A{'}$, $X_K{'}$, and $X_B{'}$ between the optical axis 44 and the points of image 38, 40 and 42 of the element positions A, K and B respectively. This parallax is of the type first defined above; i.e., the displacement of object field images resulting from a change in the viewing axis from the principal axis 35 to the optical axis 44.

As also shown in FIG. 1A, there is parallax between the points 38, 40 and 42 with respect to the points themselves. The parallax between the points 38 and 40 is designated in the figures as $X_{KA'}$, whereas the parallax between the points 40 and 42 is designated $X_{BK'}$. The parallax between the points 38 and 42 (the total of the parallax $X_{KA'}$ and $X_{BK'}$ -) on the right-hand side of the principal axis is designated $X_{R'}$.

This second type of parallax, which occurs when a single object field element successively is moved to the positions A, K and B or when a plurality of elements at these positions are simultaneously viewed, is the parallax which affects the quality of a stereoscopic picture. In particular, as will be explained in detail hereinafter, the clarity of image in a stereoscopic picture is dependent upon these parallax values $X_{KA'}$, $X_{BK'}$ and $X_{R'}$.

It is apparent from FIG. 1A that the parallax values $X_{KA'}$, $X_{BK'}$ and $X_{R'}$ may be controlled by changing one or more of the following variables: (1) the distances from the respective element positions A, K and B to the camera objective plane 20 (this includes the relative spacing of these positions with respect to each other); (2) the distances from the respective optical axes of view to the principal axis 35; and (3) the distance between the objective plane 20 and the focal plane 22 upon which the images are focused. This last variable is a function of the focal length of the lenses 24, 26 and 28. The present invention provides both a method and apparatus whereby any or all of the above-defined variables may be controlled by the photographer to obtain the desired parallax values in the stereoscopic picture.

Clearly, the respective distances of the nearest foreground element at position A, key subject matter element at position K and farthest background element at position B from the plane 20 at which the camera is positioned are, to some extent, a matter of choice with the photographer. Normally, the photographer is interested in obtaining a picture of certain key subject matter, or perhaps key subject matter and either a particular background or foreground, and needs to know the distances at which the remaining background and foreground objects should be placed from the camera.

The distances between the optical axes of view and the principal axis of the object field may also be varied by the photographer. As illustrated in FIG. 1 by the respective distances $T_1$ and $T_2$, the greater these the distances are, the larger will be the parallax values $X_{KA'}$, $X_{BK'}$ and $X_{R'}$.

As may be seen, the relative spacing of the points 38, 40 and 42 (optical axis 44 to principal axis 35 equals $T_1$) is considerably less than the spacing between points 48, 50 and 52 (optical axis 46 to the principal axis 35 equals $T_2$). In FIG. 1A $T_1$ is one-half the value of $T_2$ since, in three-dimensional photography, the optical axes of successive lenses are equally spaced.

Finally, the photographer may in some cases also control the distance between the objective plane 20 and the focal plane 22 of the photographic camera. As shown at the right-hand side of FIG. 1A, the parallax values $X_{KA'}$, $X_{BK'}$ and $X_{R'}$ may be reduced if the focal plane 22 is moved closer to the objective plane, as indicated by the plane 22'.

As may be seen, the relative spacing of the points 54, 56 and 58 (where the objective to focal plane distance equals $e_2$), is less than that of the points 48, 50 and 52 (where the objective to focal plane distance equals $e_1$).

The precise, quantitative dependency of the parallax values upon the variables identified above will be calculated and set forth hereafter; however, before this is done, it is necessary to determine the range of values, as well as the optimum value for the parallax on the final stereoscopic picture.

Figure 1B:
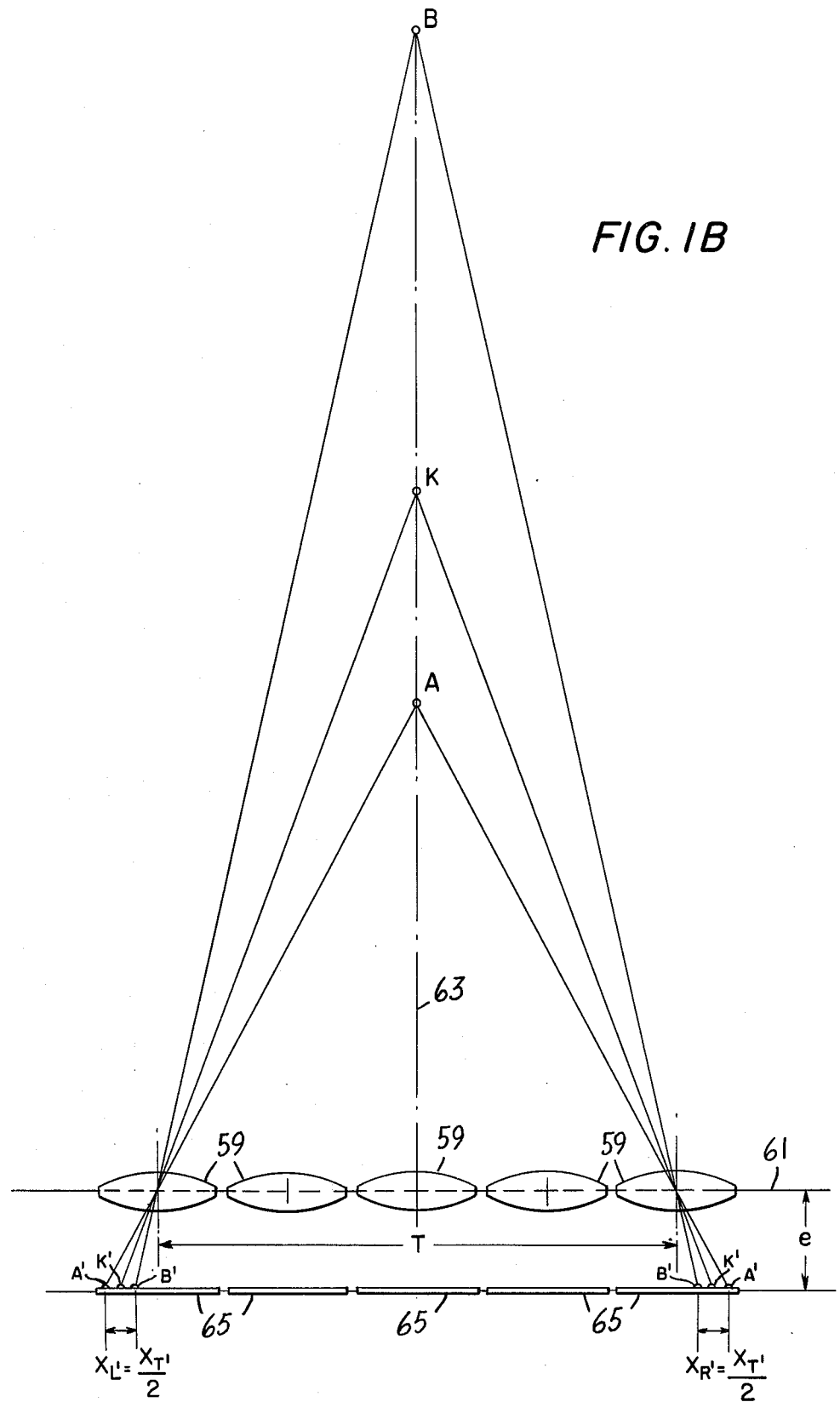
FIG. 1B is a diagrammatic view similar to FIG. 1A, showing three object field element positions and five different photographic vantage points for making photographic exposures of an object field in accordance with the principles of the invention.

FIG. 1B illustrates the conventional situation in three-dimensional photography wherein a plurality of negatives are exposed from vantage points on both sides of the principal axis of the object field. It will be understood, however, that the present invention is in no way limited to this particular configuration and that the principles derived and discussed hereinafter are applicable no matter what the orientation of the vantage points may be with respect to the principal axis of the object field.

In the arrangement shown in FIG. 1B the object field containing element positions A, K and B is viewed from five vantage points, indicated by the five lenses 59, equidistantly spaced along a "path" 61 (a straight line in the case) that is oriented perpendicular to the principal axis 63. Images of the object field elements at points A, K and B are focused on respective negatives 65 beneath each lens. Because the left-most and right-most lenses are symmetrically spaced about the principal axis, the parallax $X_L'$ between the images formed by the left-most lens will equal the parallax $X_{R'}$ between the images formed by the right-most lens.

If we define total parallax as:

$$X_{T'} = X_{L'} + X_{R'}, \tag{1}$$

then $$X_{L'} = X_{R'} = X_{T'/2}$$

It may readily be seen from the geometry of the diagram of FIG. 1B that the maximum parallax values will occur at the left-most and right-most vantage points. It is also apparent that, for a given focal length (f) for the lenses 59 and, in turn, given distance (e) to the plane of the negatives 65, and for a given object field, the total parallax value $X_{T'}$ will depend entirely upon the distance T between the left-most and right-most vantage points. It may be shown, in fact, that this total parallax value is invarient to the position of the vantage points with respect to the principal axis. Thus, for example, if the vantage points in FIG. 1B were moved to the right so that the left-most vantage point were aligned with the principal axis as shown in FIG. 1A (and $X_{L'} = O$), $X_{R'}$ would double its value so that $X_T'$ would remain unchanged.

Figure 2:
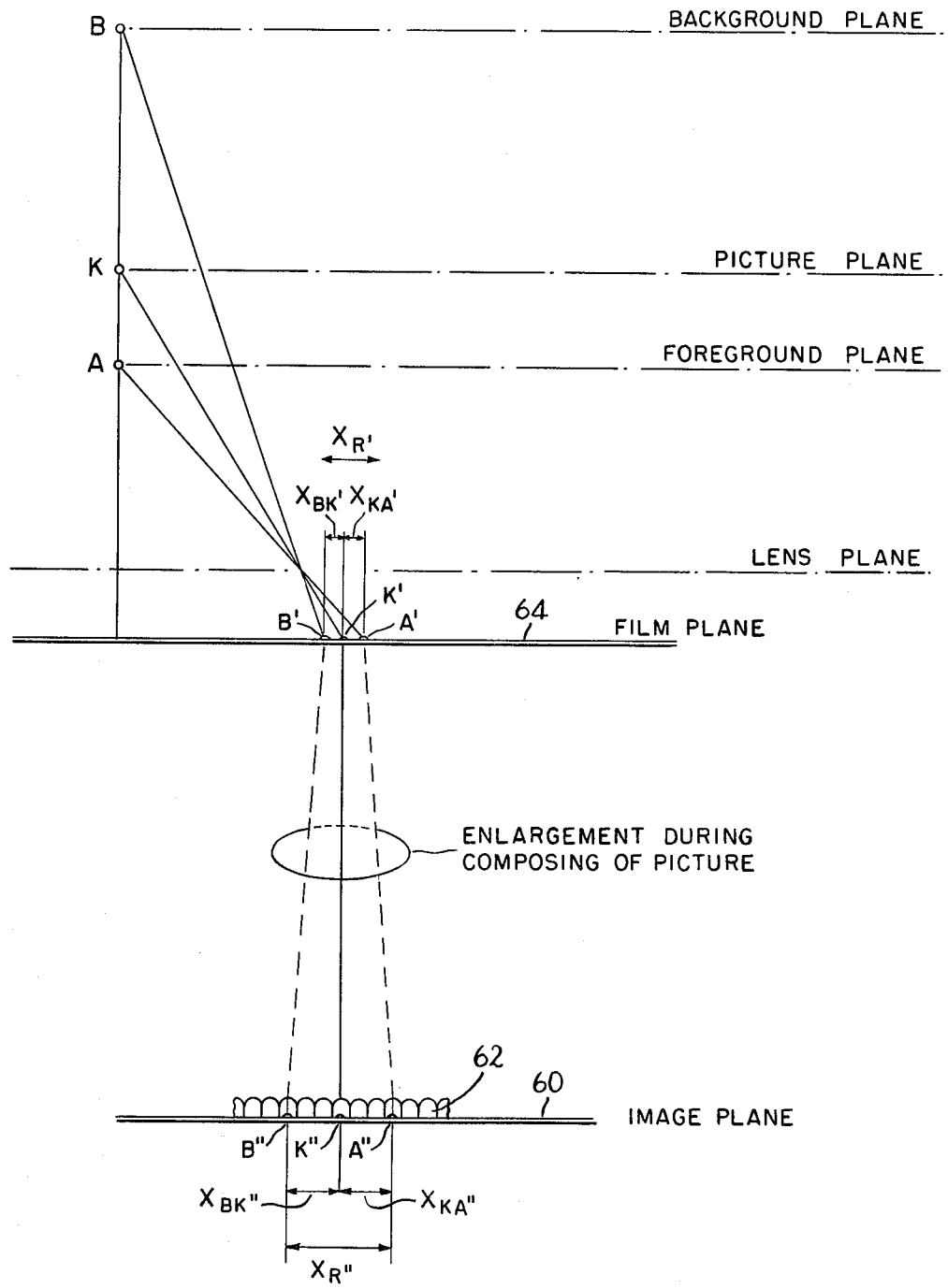
FIG. 2 is a diagrammatic view showing three object field element positions, one photographic vantage point and an enlarged stereoscopic picture.

FIG. 2 illustrates the manner in which a photographed object field is imaged on photosensitive film 60 adjacent a lenticular screen 62 by means of a technique known in the art as "composing". As explained above in the introduction to this specification, the technique of composing is used in the "indirect" method of producing stereoscopic pictures. After a plurality of two-dimensional negatives 64 have been exposed by a camera at different vantage points with respect to the object field, the negatives are developed and the images thereon projected by means of an enlarger onto a lenticular screen 62 and photosensitive film 60.

In order to achieve the stereoscopic effect, the negative images are successively projected onto the lenticular screen 62 and film 60 in such a manner that the key subject matter element in every image will be in registry. Suitable techniques of composing in this manner are described, for example, in the aforementioned U.S. patent application Ser. No. 379,388, filed July 16, 1973 by Jerry C. Nims and Allen K. L. Now U.S. Pat. No. 3,895,867.

During the composing process the actual size of the stereoscopic picture can be controlled; i.e. by the degree of enlargement permitted. In FIG. 2 an enlargement ratio of approximately 3:1 is illustrated so that the parallax values $X_{KA''}$, $X_{BK''}$ and $X_{R''}$ in the final picture are actually three times as large as the corresponding values of $X_{KA'}$, $X_{BK'}$, and $X_{R'}$ in the photographic negative 64.

In an ideal three-dimensional picture, the shifting distance or displacement of the nearest foreground element image (the image of an element at position A) and the farthest background element (the image of an element at position B) between each successive two-dimensional negative image should equal the width of one lenticule of the lenticular screen. As will be pointed out hereinafter in connection with FIGS. 4 and 5, this relationship allows the observer to see a solid, sharply focused image of the foreground object and the background object, although these objects are photographed from different viewpoints. If the shifting distance of either of the nearest foreground or the farthest background element images between successive two-dimensional negative images exceeds the width of one lenticule of the lenticular screen, then the foreground element image will interfere with the key subject matter and the background element image, and visa versa. A clear picture will therefore not be presented to the observer so that all the photographed images will look blurred and out of focus.

Figure 3:
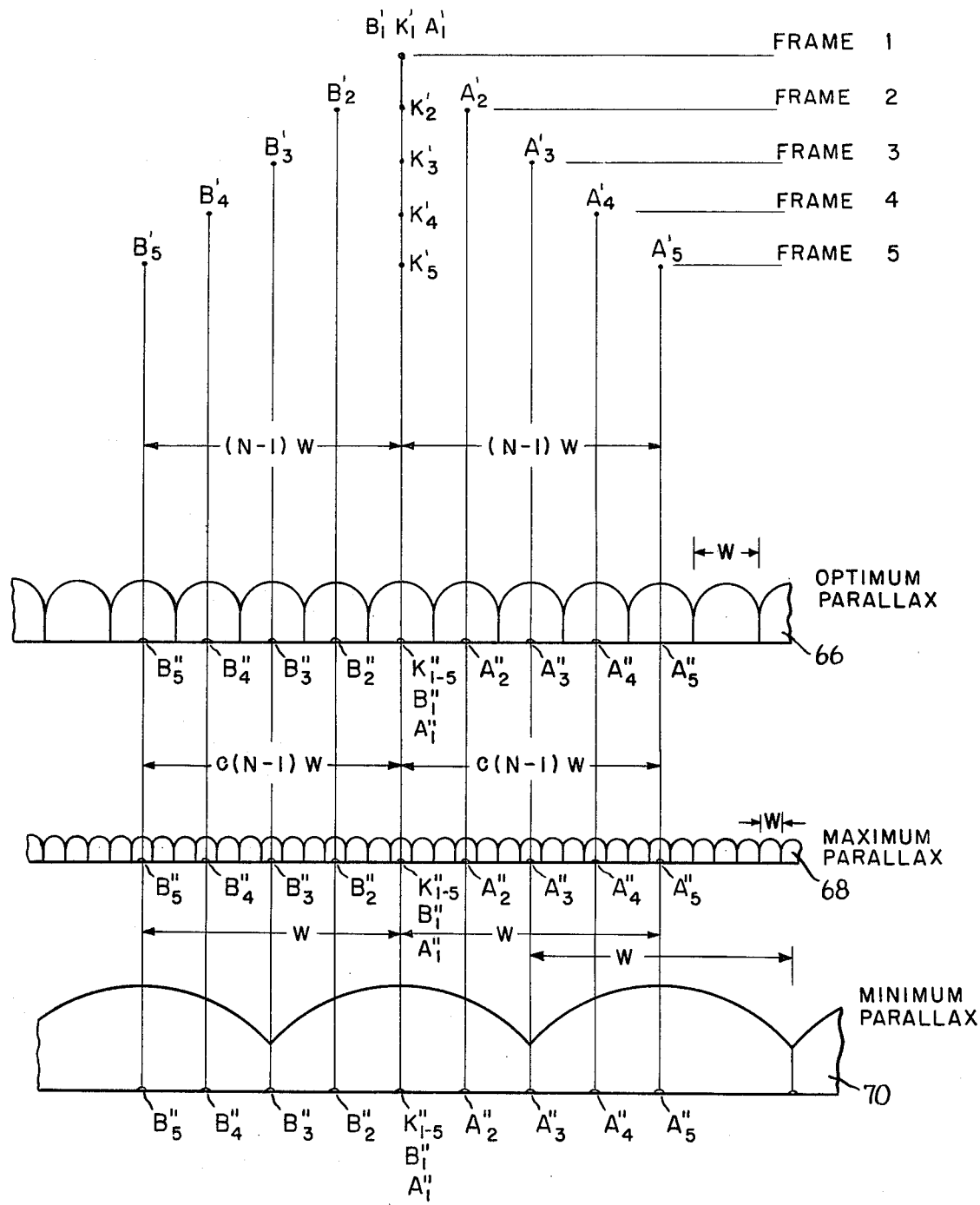
FIG. 3 is a diagrammatic view illustrating the effect of three values of parallax in a five-frame stereoscopic picture.

FIG. 3 illustrates the positions of the nearest foreground element images A'', the key subject matter element images K'' and the farthest background element images B'' from five different two-dimensional negatives (1–5) as these images would be aligned in the composing process. In the particular example chosen, the five negatives were exposed from vantage points starting at the principal axis of the object field and extending, at equally spaced intervals, toward the right. Thus, the negative taken at the left-most vantage point ("frame 1") results in no parallax at all, while the negative taken at the right-most vantage point ("frame 5") produces the maximum parallax on the lenticular screen. Since in this case $X_{L''} = 0$, $X_{T''} = X_{R''}$ pursuant to equation (1), above.

Notwithstanding the special case illustrated in FIG. 3 which was chosen for the purpose of clarity in describing the invention, it should be understood that the values of $X_{T''}$ and $X_{T'}$ which will be derived below are applicable to other vantage point-to-principal axis configurations and, in particular, to the symmetrical configuration shown in FIG. 1B.

The upper lenticular screen 66 in FIG. 3 illustrates the ideal three-dimensional picture in which the nearest foreground element images and the farthest background element images from successive negatives are spaced exactly one lenticule width apart. If the width of each lenticule of the lenticular screen be designated as W, the optimum parallax between the key subject matter images $K''_{1-5}$ and the nearest foreground element image $A''_5$, (or the key subject matter images $K''_{1-5}$ and the farthest background element image $B''_5$) on the first and last frames in the final picture will equal (N−1)W, where N is the total number of frames or negatives.

Hence, the optimum parallax values for the final picture are:

$$X_{BK''} = (N-1) W$$

$$X_{KA''} = (N-1) W;$$

and $$X_{T''} = 2(N-1) W$$

If the final picture is an enlargement of the negatives taken by the camera as illustrated in FIG. 2, the parallax on the camera negatives must be reduced from this value in the final picture by the enlargement ratio. If this ratio of final picture size to the negative size be designated as R, the optimum parallax values for the camera negatives will be given by:

$$X_{BK'} = \frac{1}{R}(N-1) W;$$

$$X_{KA'} = \frac{1}{R}(N-1) W; \text{ and}$$

$$X_{T'} = \frac{2}{R}(N-1) W.$$

From a practical and economic point of view, it may be desirable to increase the parallax somewhat so that the shift between successive frames on the final picture is greater than the width of one lenticule. As pointed out below, this is especially true where there are foreground or background elments intermediate to the nearest foreground element A or the farthest background element B, respectively, and the key subject matter element K. Depending upon the value of W to be used, the size and color of the objects to be photographed, and the desired lightness and contrast of the final picture, it is possible to increase the parallax significantly without substantial degradation in the quality of the picture. Such an increased parallax is illustrated in FIG. 3 with the lenticular screen 68. In this particular case the shift between successive frames is exactly 3 times the lenticule width W of the lenticular screen 68.

Figure 4:
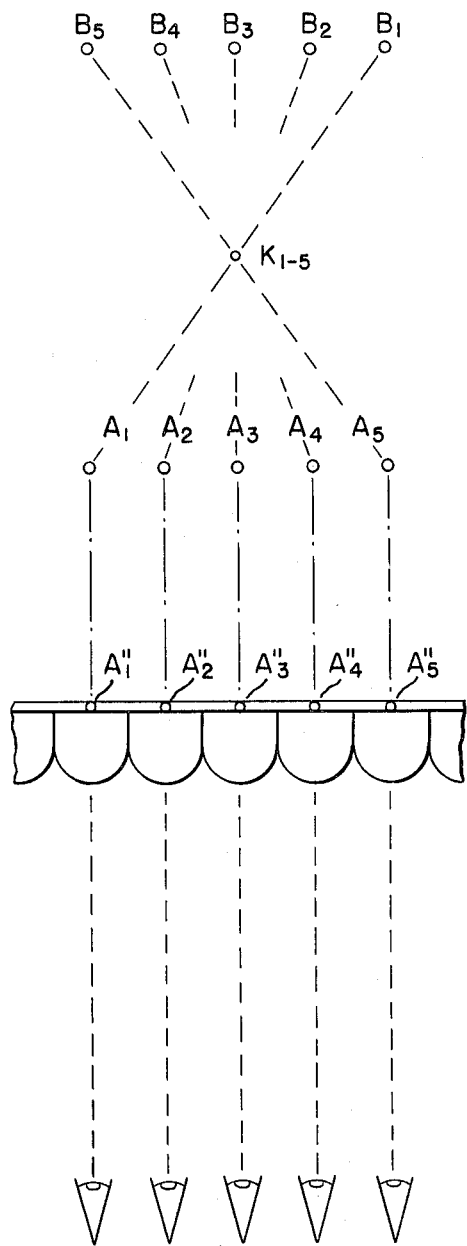
FIG. 4 is a diagrammatic view illustrating the effect of optimum parallax in a stereoscopic picture.
Figure 5:
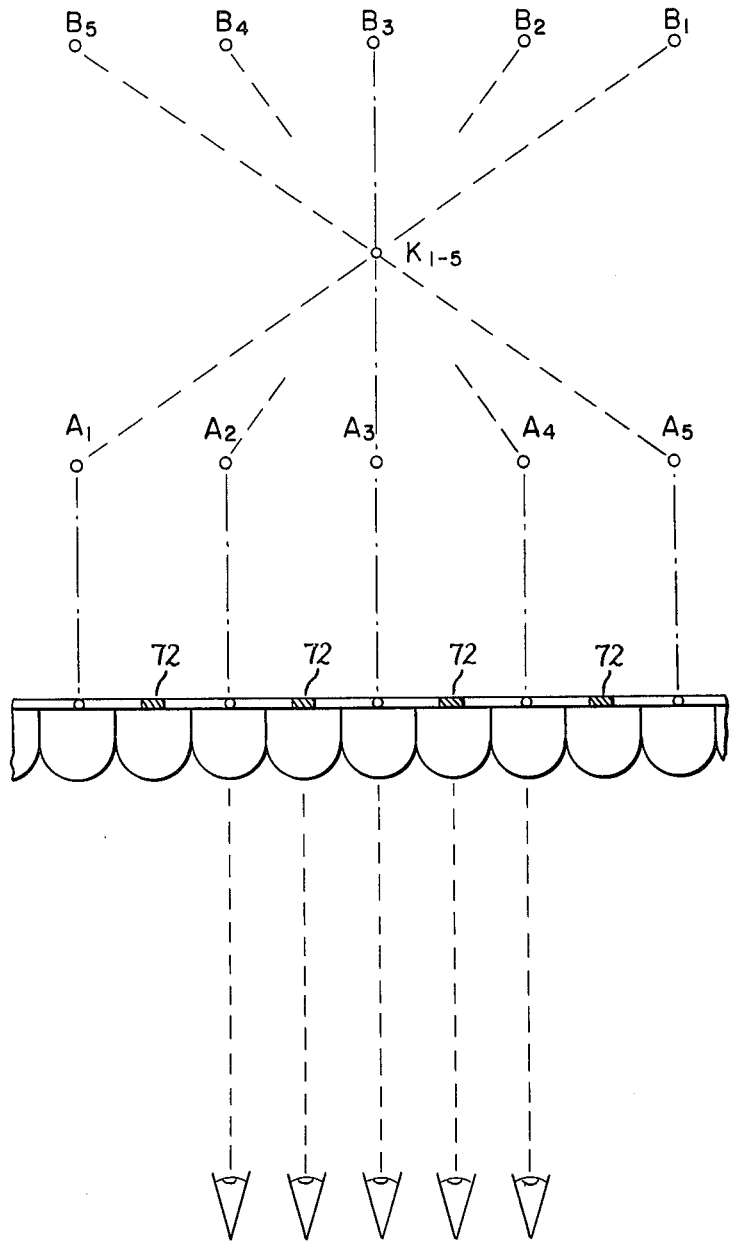
FIG. 5 is a diagrammatic view illustrating the effect of a greater than optimum parallax in a stereoscopic picture.

The actual shift between successive frames may be either greater or less than 3W depending upon the aforementioned photographic conditions. Theoretically, this shift may vary anywhere from 1/(N−1) times the lenticule width W up to some multiple of W at which undue blurring of images of undue interference between images is encountered. The shift factor, which equals the number of lenticules or fraction thereof shifted between frames, will hereinafter be designated by the letter c. The maximum value of c suitable for any given set of photographic conditions, while not dependent entirely thereon, has been found to be significantly influenced by the lenticule width W of the viewing screen. Specifically, smaller values of W generally allow the use of larger values of c. This is because as W gets smaller, and particularly as it approaches a fineness at which it is imperceptible, or appreciably so, to the eye, the effect of a skipped lenticule on image quality, described hereinafter in connection with FIGS. 4 and 5, is not nearly as pronounced as with larger lenticules. More particularly, experiments have shown that c values of up to 5.0 are generally useful with all commonly used lenticule widths, e.g. $W=0.48$mm, depending upon the other factors of object image size, contrast, etc., mentioned above, but that $c$ values in excess of 5.0 and at least as high as 10.0, may be safely used with extra narrow or fine lenticule widths on the order of 5.0 mils (0.125mm) or less. It will be appreciated that 5.0 mils is not an absolute limit of W beyond which $c$ values of greater than 5.0 cannot be used, but that, as a general rule, higher quality pictures will be obtained if $c$ values of greater than 5.0 are restricted to use with such lenticule widths, that is to say, to lenticular widths of 5.0 mils or under.

As an example of the selection of $c$ for a common lenticule width, say 0.48mm, if the images of the object photographed are small in comparison to the lenticule width W of the lenticular screen (e.g. 10W or less) and/or a high contrast picture (e.g. between the key subject matter and background) is desired, $c$ may lie between 1 and 3. However, when the images of the objects photographed are large in comparison to the lenticule width W and/or the resulting picture is to be of low contrast, $c$ may range from 3 to 5. In some cases an even larger value of $c$ may be acceptable, even though W exceeds 5.0 mils, the ultimate test being whether pictures of acceptable quality for the purpose intended can be produced.

For a W of 5.0 mils or less, it has been found that $c$ values as high as 10.0 are acceptable. For example, pictures of good quality have been obtained with a lenticular width of ≈5 mils and a $c$ factor of substantially 10. Of course, any lower value of $c$ could be used, and the foregoing considerations in respect of lenticule width, contrast, object image size, etc. will be understood to operate as constraints on the maximum value of $c$ which may be used. For instance, excellent quality has been obtained with a lenticule width of 3.15 mils and a $c$ factor of approximately 9. Likewise, it will be understood that the maximum permissible shift $c$ might not result in every photographic situation, as the preceding example illustrates. Often, however, it is desirable for other reasons, relief effect, camera lens spacing, etc., to use or closely approach the maximum permissible value.

The maximum parallax values for the final picture may therefore be expressed as:

$$X_{BK}{''} = c(N-1)W;$$

$$X_{KA}{''} = c(N-1)W;$$

and $$X_T{''} = 2c(N-1)W;$$

where $c$ is the maximum permissible number of lenticules shifted between frames (normally between 1 and 10 as described above), N is the number of photographic frames, and W is the lenticule width of the lenticular screen.

The corresponding maximum values for the photographic negatives are equal to the above maximum values divided by the enlargement ratio R. Thus:

$$i X_{BK}{'} = \frac{c}{R}(N-1)W;$$

$$X_{KA}{'} = \frac{c}{R}(N-1)W; \text{ and} \quad (2)$$

$$X_T{'} = \frac{2c}{R}(N-1)W$$

As a specific example of the acceptable range of values for $X_T{''}$ for a stereoscopic picture, it has been found, in practice, that for a lenticular screen having a thickness of 2 millimeters and a lenticule width of 0.48 millimeters, high quality pictures are obtained under general photographic conditions if the total parallax value ($X_T{''}$) on the stereoscopic picture is within the range of from 16 to 48 times the lenticule width when nine frames are taken and used to compose the picture. In this case $c$ varies from 1.0 to 3.0.

The theoretical minimum parallax condition is illustrated at the bottom of FIG. 3 with the viewing lenticular screen 70. As may be seen, the image $B''_5$ (or $A''_5$) from the final frame in the succession of frames should be spaced from the $B''_1$ (or $A''_1$) image from the initial frame by at least the width W of one lenticule. If the distance between the images $B''_1$ and $B''_5$ (or $A''_1$ and $A''_5$) be less than the width of one lenticule, all of the images will fall within a single lenticule with the result that, while the separate images may still be seen, the angle of convergence between the separate images will be too small for significant stereoscopic relief. It is for this reason that a $c$ greater than 1.0 is desirable when there are intermediate foreground or background object field elements. Although in this case both the nearest foreground element image $A''$ and the farthest background element image $B''$ will shift by one lenticule and will therefore be seen in proper stereoscopic relief, the images of the intermediate elements will shift less than one lenticule and will not be seen with sufficient relief. The preferred minimum value of $c$, therefore, is 1.0.

The theoretical minimum parallax value permissible for a lenticular screen type stereoscopic picture is therefore:

$$X_{BK}{''} = W;$$

$$X_{KA}{''} = W;$$

and $$X_T{''} = 2W.$$

Consequently, the theoretical minimum parallax value for the images on the negatives is:

$$X_{BK}{'} = W/R;$$

$$X_{KA}{'} = W/R;$$

and $$X_T{'} = 2W/R.$$

Upon comparing these equations with the equations (2) above, it may be seen that the lower limit of parallax in the equations (2) would be reached if $c$ were made equal to $1/(N-1)$. Accordingly, the equations (2) may be made generally applicable if the range of $c$ is chosen between the limits $1/(N-1)$ to 10.0, inclusive.

As explained above, the maximum value of $c$ is a function of the photographic conditions such as the size of the object or objects to be photographed, the amount of light, degree of contrast, and the magnitude of W, and has an optimum value of 1. That is to say, a $c$ of 1.0 will provide a high quality picture under any given set of conditions.

Finally, it should be noted that the total number of photographic frames N of a stereoscopic picture also has an upper and a lower limit. Since the width of the condensed image from each frame beneath each lenticule on the photosensitive film must be at least within the resolving power of the lenticular screen, the number of condensed images per lenticule cannot exceed L, where L is the resolving power of the lenticular screen in lines per lenticule. Since, where the parallax is at a minimum, the number of condensed images per lenticule equals the number of frames N, the number of frames should not exceed L.

For better image and color reproduction in a stereoscopic picture the condensed two-dimensional images should be at least two times the width of the resolution line of the viewing lenticular screen of the final picture. Therefore, the number of negative frames N which are exposed preferably is less than L/2. Since the minimum number of two-dimensional picture frames required to produce a three-dimensional picture is 2, N preferably falls in the following range:

$$2 \leq N \leq L/2.$$

In the above consideration of the parallax involved in a stereoscopic picture, the example of the indirect method of producing pictures was used. Since the principles of parallax remain the same for a stereoscopic picture no matter how the picture is produced, the equations (2) are applicable to the direct method as well. Although a single three-diminsional negative with lineiform images is produced with the direct method (instead of a plurality of two-dimensional negatives), the single three-dimensional negative is nevertheless exposed at a plurality of vantage points. The number of different vantage points may therefore be used for the quantity N in equations (2).

In some instances with the direct method, the single three-dimensional negative is exposed while the camera is caused to scan the object field in a continuous manner along a vantage "path". Since there are an infinite number of vantage points along this path, obviously this number (infinity) cannot be used as a value of N. In this case, the resolving power of the lenticular screen divides the continuously moving image of the lenticular screen divides the continuously moving image of the object field during exposure into a finite number of resolution lines on the camera negative. This resolving power of lines per lenticule can therefore be used as the number N. For example, if the resolving power of the viewing (in camera) lenticular screen is 60 lines per lenticule element, then N should not exceed 60, and preferably is less than 30(L/2), where the continuous scanning technique is employed.

FIGS. 4 and 5 illustrate the advantage of maintaining the parallax in a stereoscopic picture at its optimum value; in particular, at a value such that corresponding nearest foreground and farthest background element images from each successive photographic frame will be composed in the final picture beneath a successive lenticule of the lenticular screen. In FIGS. 4 and 5, the views of the object field, including elements at positions A, K and B, as seen from five vantage points, and as photographically recorded from each vantage point, are superimposed with the images of the element at position K in alignment. The effect on the final stereoscopic picture, as viewed (also illustrated), resulting from shifting of foreground and background element images (e.g., $A_1''$, $A_2''$, $A_3''$, etc.) between frames may therefore be readily appreciated. As may be seen in FIG. 4, when the shifting distance between adjacent frames of the image of the foreground element at position A is equal to the width W of one lenticule, an observer can see that image from all angles and positions of view of the final stereoscopic picture. However, as in FIG. 5, when the shifting distance of the image of the foreground element is greater than the lenticule width, the nearby images 72 of the key subject matter and/or background elements will interfere with the foreground element image. In high contrast pictures or with lenticules larger than 5.0 mils, this may obstruct the observer's vision and create an out-of-focus effect.

In a low contrast picture or with fine lenticules ($W=5.0$ mils or less) the interfering rays extending from the nearby images of the key subject matter and/or background elements are relatively weak or are not discerned to an appreciable extent. In these cases, the parallax can be increased to enhance the three-dimensional effect in the picture or to permit increased T values (e.g. $c=3$ or 4 for relatively large lenticules or $c=8$ to 10 for fine lenticules). In a high contrast picture where the interfering rays are strong, the parallax value should be kept lower (e.g. $c=1$ or 2 for larger lenticules or $c=6$ or 7 for fine lenticules), so that these rays will not interfere with the observer's vision and the three-dimensional picture will appear sharply focused.

The optimum as well as the permissible range of parallax values for a stereoscopic picture have now been derived. It remains to be determined how a photographer should select those variables within his immediate and direct control so as to achieve the proper parallax and, in turn, the desired picture quality.

At the outset, it will be noted that for each of the maximum, optimum and minimum parallax values, the value between element images at positions B and K ($X_{BK'}$) and the value between element images at positions K and A ($X_{KA'}$) are preferably equal. Thus, in order to obtain a high quality stereoscopic picture in which both background and foreground are present:

$$X_{BK'} = K_{KA'}.$$

It should be emphasized, however, that not all stereoscopic pictures include both a background and foreground. In some cases, it is desirable to photograph key subject matter which is to lie in the plane of the picture together with only background elements or objects which are to lie behind the plane of the picture. In this case, only the parallax value $X_{BK'}$ need be considered so that for the images obtained from the right-most and left-most vantage points, respectively:

$$X_{BK'} = X_{R'};$$

$$X_{BK'} = X_{L'}.$$

Similarly, it may be desirable to photograph a scene having only key subject matter which is to lie in the plane of the picture and foreground elements or objects which are to lie in front of the plane of the picture. In this case, only the parallax $X_{KA'}$ need be considered so that for the right-most and left-most vantage points, respectively:

$$X_{KA'} = X_{R'};$$

$$X_{KA'} = X_{L'}.$$

Figure 6:
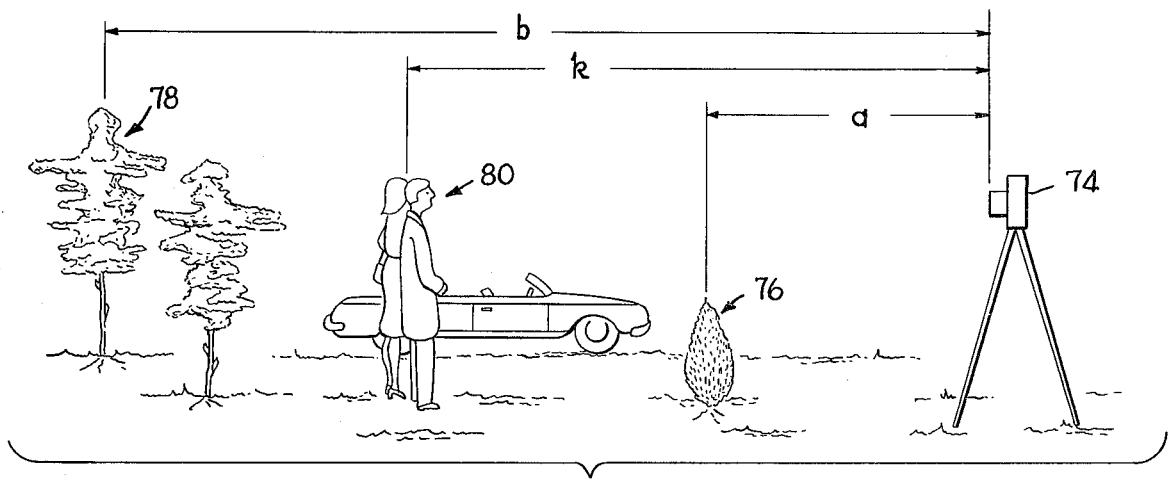
FIG. 6 is a somewhat diagrammatic view illustrating one photographic arrangement when taking a stereoscopic picture.

FIG. 6 illustrates a typical snapshot-type photographic situation in which a camera 74, capable of taking a plurality of horizontally spaced photographs, is arranged facing to the left and in position to photograph the scene depicted. In this scene, there is a nearest object (a bush) indicated generally by the reference character 76 and a farthest object (a tree) indicated generally by the reference character 78. The key subject matter of the scene, the two persons indicated generally by the reference character 80, are located between the nearest and farthest objects 76 and 78, respectively.

As explained above, in order to obtain a high quality stereoscopic picture it is necessary for the photographer to control the parallax between the images appearing on the negatives of the camera 74. In particular, he should maintain the parallax between the images of objects 76 and 80 approximately equal to the parallax between the images of objects 78 and 80, and he should maintain the total parallax $X_T$, within the maximum permissible value $(2c/R)(N-1)W$. This is accomplished, as will be explained in detail hereinafter, by relating the following variables (see also FIG. 7):

1. $a$-the distance from the camera objective plane to the nearest foreground element to be photographed.
2. $k$-the distance from the camera objective plane to the key subject matter element.
3. $b$-the distance from the camera objective plane to the farthest background element to be photographed.
4. $f$-the focal length of the camera lens (or lenses).
5. $e$-the distance from the objective plane to the film plane of the camera.
6. N-the number of vantage points from which pictures are taken (or, in the case of the continuous scanning direct method, the number of resolution lines per lenticule).
7. R-the enlargement ratio of the size of the final stereoscopic picture to the size of the camera negative or negatives.
8. T-the maximum horizontal distance between the left-most vantage point and the right-most vantage point; i.e., from one extreme photographic vantage point to the other.
9. W-the lenticule width of the lenticular screen of the final stereoscopic picture.

The value of $c$, which will hereinafter be called the "parallax factor"; may also be considered a "variable" under control of the photographer.

Figure 7:
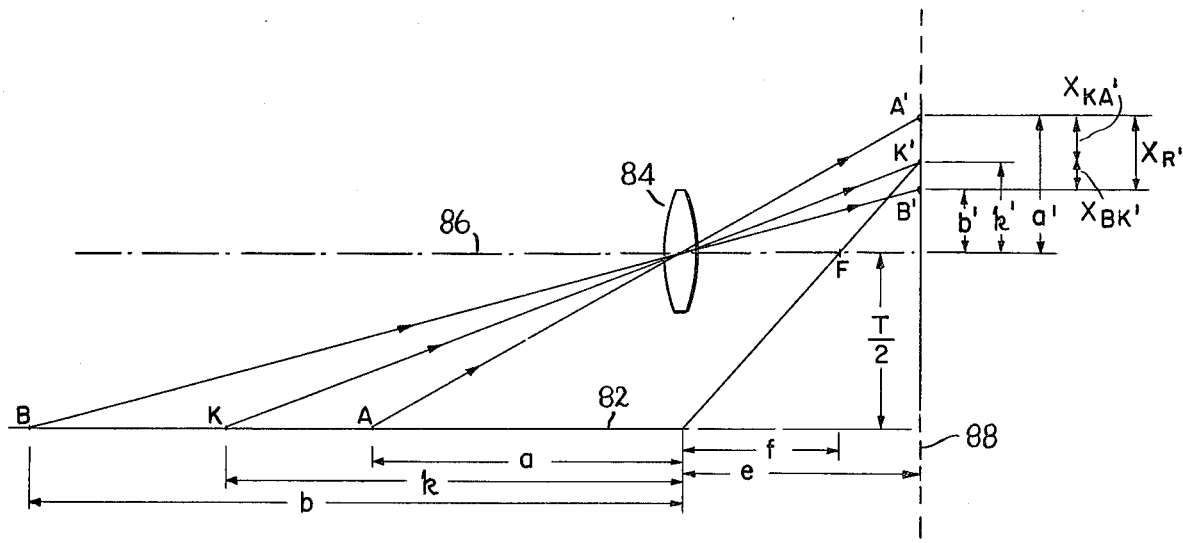
FIG. 7 is a diagrammatic view of an optical system employed in taking a stereoscopic picture.

The relationship of the above variables to each other and to the values of parallax $X_{BK'}$, $X_{KA'}$ and $X_{T'}$ will now be derived with reference to FIG. 7. FIG. 7 is a schematic illustration similar to FIG. 1 showing three object field element positions A, K and B arranged on a line or principal axis 82, a lens 84 arranged with its optical axis 86 parallel to the principal axis 82, and a film plane 88.

It will be assumed in this case that the lens 84 is situated at the right-most vantage point of a plurality of vantage points and that the left-most vantage point arranged symmetrically with respect to the principal axis 82, so that:

$$X_{R'} = X_{L'};$$

and $$X_{T'} = 2X_{R'}.$$

The basic optical equation for the configuration shown in FIG. 7, where the lens is focused on an element at position K at a distance $k$ from the lens plane is:

$$1/e + 1/k = 1/f$$

or $$e = kf/k-f.$$

By simple trigonometric relations, it may be seen that:

$$k' = \frac{Te}{2K} = \frac{T}{2k} \frac{(kf)}{(k-f)} = \frac{Tf}{2(k-f)}$$

$$a' = \frac{Te}{2a} = \frac{kTf}{2a(k-f)} = \frac{k}{a}k'$$

$$b' = \frac{Te}{2b} = \frac{kTf}{2b(k-f)} = \frac{k}{b}k'$$

As explained above, the parallax values $X_{BK'}$ and $X_{KA}$ should be made equal for a high quality three-plane stereoscopic picture.

Thus:

$$a'-k' = k'-b'.$$

Substituting the values derived above for $a'$ and $b'$, it can be shown that:

$$k/a + k/b = 2 \qquad (3)$$

Now the total parallax value at the film negative is given by $$X_R = a'-b'$$

or $$X_{R'} = \frac{k}{a}k' - \frac{k}{b}k'$$

Substituting the value for $k'$ derived above and transposing the preceding equation:

$$\frac{kTf}{a2(k-f)} - \frac{kTf}{b2(k-f)} = X_{R'} = \frac{X_{T'}}{2}$$

Assuming $k/k-f$ is approximately unity, as will be the case in most photographic conditions, then:

$$T = \frac{X_{T'}}{f} \frac{(ab)}{(b-a)} \qquad (4)$$

Thus, substituting the value of parallax given in equations (2) above, the result is:

$$T = \frac{2abc(N-1)W}{f(b-a)R} \qquad (5)$$

Using the equations (1), (2), (3), and (4) or equations (3) and (5), a photographer can choose and control the parallax in a stereoscopic picture. He will therefore be assured that all the stereoscopic pictures taken will be of consistently high quality.

For greater accuracy at small values of $k$ and/or with long focal lengths $f_t$, the following form of equation (5) is preferred:

$$T = \frac{2abc(N-1)W}{f(b-a)R} \cdot \frac{(k-f_t)}{f_t} \quad (5a)$$

To illustrate the photographic technique which may be employed by a photographer according to the present invention, let us assume that the photographer desired to photograph an object field having a particular key subject matter and particular background and that, in addition to the key subject matter and background, the photographer would like to include a suitable foreground object. First, the photographer chooses a suitable distance $k$ between his camera and an element of the key subject matter which he would like to fall in the plane of the picture; next he notes the distance $b$ from his camera to the farthest element or point of the background. Using equation (3) the photographer then solves for the distance $a$ to the nearest foreground point includable in the picture, consistent with good picture quality.

Similarly, if the distances $k$ and $a$ or even $a$ and $b$ are initially known, the photographer may solve for the unknown distance $b$ or $k$, respectively, using equation (3).

Thereafter, knowing $a$ and $b$ as well as all the variables R, $c$, N, $f$ and W (any or all of which are subject to choice) the photographer determines the distance T using equation (5) or (5a). The value of $c$ is selected from 1.0 to 10.0, as described above, depending upon photographic conditions such as the lenticule width and nature, lighting and contrast of the object field, etc. The photographer then proceeds to take N equally spaced photographs of the object field with the distance between the optical axes of the camera objective in taking the left-most photograph and the right-most photograph equal to T. The central photographic vantage point should be, in this case, on the principal axis of the object field.

Conversely, assuming that the photographer has a fixed distance T between the optical axes of the left-most objective and the right-most objective on a plural-lens camera, the photographer may use equation (5) or (5a) to determine one of the distances $a$ or $b$, given the other and use equation (3) to determine the distance $k$.

If the photographer wishes to position the left-most (or right-most) vantage point on the principal axis of the object field, $X_L{'}$ (or $X_R{'}$) will equal zero, so that:

$$X_R{'} = X_T{'} = \frac{2c}{R}(N-1)W;$$

or $$X_L{'} = X_T{'} = \frac{2c}{R}(N-1)W,$$

using equations (1) and (2). Similarly, if the left-most and right-most vantage points are to be positioned arbitrarily with respect to the principal axis:

$$X_T{'} = X_R{'} + X_L{'} = \frac{2c}{R}(N-1)W$$

from equations (1) and (2). Given the value of $X_T{'}$, the distances $a$, $b$, $k$ and T may be determined in accordance with equations (3) and (4).

If the photographer desires to take a three-dimensional picture of a scene having only key subject matter and background, or key subject matter and foreground, the total parallax ($X_T{'}$) must appropriately be reduced by a factor of two. In particular, one of the parallax values $X_{BK}{'}$ and $X_{KA}{'}$, respectively, must be substituted for the value $X_T{'}$ in the equation (4). In addition, since the key subject matter element will be the nearest foreground element in the case of an object field having only key subject matter and background, or will be the farthest background element in an object field having only key subject matter and foreground, the distance $k$ should be substituted for $a$ or $b$, respectively, in equation (4). That is, for a picture having only key subject matter and background:

$$T = \frac{X_{BK}{'}}{f} \cdot \frac{kb}{b-k};$$

and for a picture having only key subject matter and foreground:

$$T = \frac{X_{KA}{'}}{f} \cdot \frac{ak}{k-a}.$$

Figure 8:
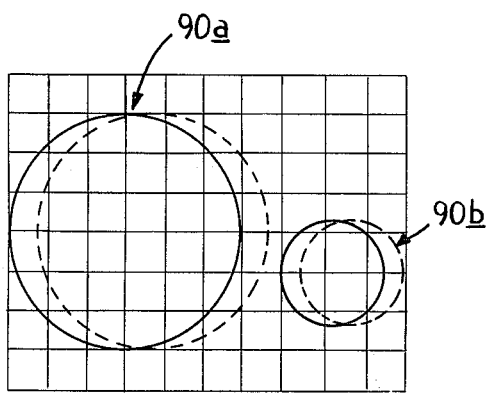
FIG. 8 is a representational view illustrating a finished stereoscopic picture.
Figure 9:
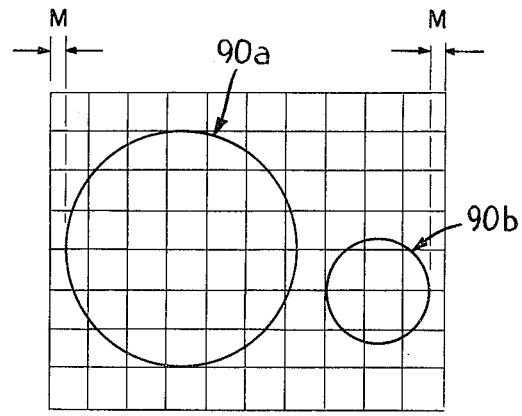
FIG. 9 is a representational view, related to FIG. 8, illustrating a technique for locating the object images within the picture area of the final stereoscopic picture.

When photographing the scene, the photographer must consider the effect of parallax on the picture composition. FIG. 8 shows the desired appearance of a composed stereoscopic picture wherein the small appearance of a compound stereoscipic picture wherein the small and large objects 90a and 90b diagrammatically depicted are just within the picture area. The images of the large and small objects indicated by solid lines represent those recorded at the right-most vantage point, while the dashed lines indicate the images of the objects recorded at the left-most vantage point. To assure that all images of the objects will be within the picture area, the photographer should make certain that ample margins (M) are included at the left and right-hand sides of the photographic negatives, relative to the positions (indicated by solid lines in FIG. 9) of the images of 90a and 90b at the central vantage point, so that, because of parallax, the object images in the stereoscopic picture, as shown in FIG. 8, will not extend beyond the opposite sides of the picture area.

Figure 10:
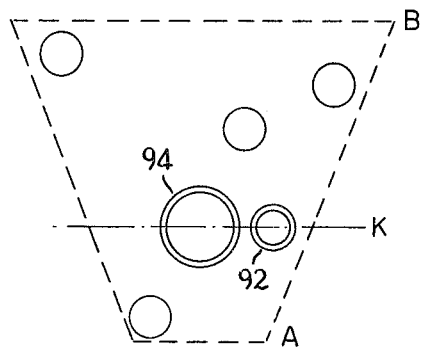
FIG. 10 is a diagrammatic plan view of a scene to be photographed.
Figure 11:
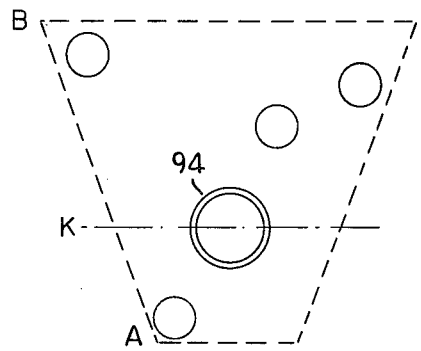
FIG. 11 is a diagrammatic plan view which, taken in conjunction with FIG. 10, illustrates a particular photographic technique.

One special technique available to a photographer when taking stereoscopic pictures permits selected objects in the picture to either change position or disappear, depending upon the angle with which the stereoscopic picture is viewed. For example, the effect of disappearing objects can be achieved as shown in FIGS. 10 and 11 by shooting the left-most half of the N frames with the selected object 92 in position, and then shooting the right-most half of the N frames with the object 92 removed. The disappearing object 92 must be maintained within the general plane of the key subject matter 94. The effect of moving objects can be achieved in a similar manner by changing the position of the selected object when shooting the left half and right half of the N frames.

SPECIFIC REPRESENTATIVE EMBODIMENTS

Representative embodiments of the present invention, by which the foregoing inventive concepts may be practiced, will now be described with reference to FIGS. 12–22 of the drawings. In these figures, identical elements will be designated with identical reference characters.

Figure 12:
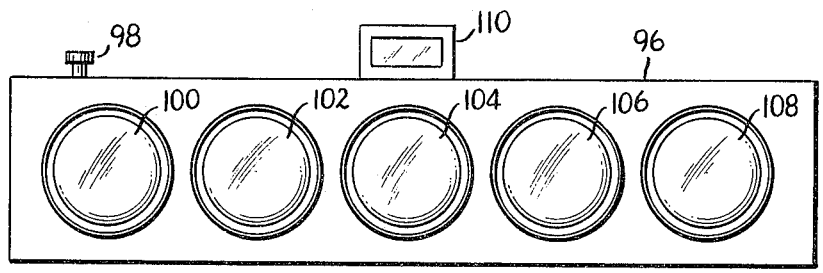
FIG. 12 is an elevational view of a camera according to a first representative embodiment of the present invention.
Figure 13:
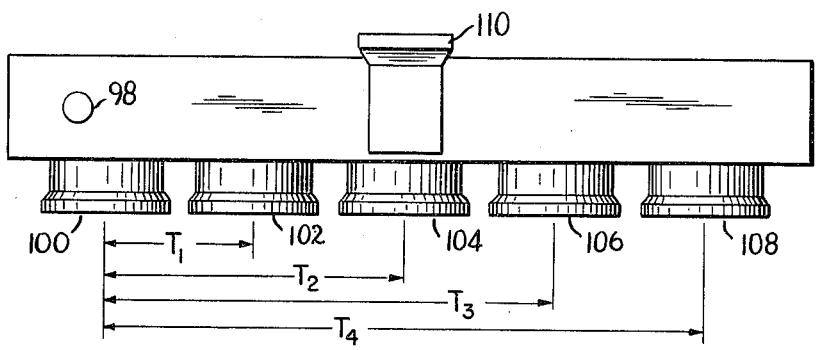
FIG. 13 is a top view of the camera illustrated in FIG. 12.

FIGS. 12 and 13 show a plural lens camera capable of simultaneously taking, for example, from two to five pictures (N is in the range: 2–5). This camera includes a housing or body 96; a shutter button 98; five lenses 100, 102, 104, 106 and 108 and a viewing or siting device 110. In accordance with the present invention, the photographer can control the distance T between the optical axes of the left-most and the right-most picture-taking lenses in any suitable way; for instance:

1. The camera may be constructed to permit selection of those lenses 100–108 through which pictures will be taken. Thus, for example, the photographer may select lenses 100, 102 and 104 to give $T = T_2$; or he may select all lenses so that $T = T_4$. A camera and shutter mechanism appropriate for this purpose are described in the copending, commonly-owned United States application of Jerry C. Nims and Allen Lo filed July 16, 1973 and bearing Ser. No. 379,386, now abandoned which is a divisional of application Serial No. 171,269 filed August 12, 1971, now abandoned. The same camera and shutter structure is described in U.S. Pat. No. 3,852,787, which issued on application Ser. No. 379,387, also a divisional of application Ser. No. 171,269.

2. The camera may be constructed to permit expansion or contraction of the body 96 in a direction transverse to the lens axes, thus permitting adjustment of the lateral spacing between the optical axes of the lenses 100–108. Although this expandable construction is not illustrated in FIGS. 12 and 13, it will be understood that any suitable arrangement permitting an adjustable separation of the respective lenses may be provided. For example, five separate camera lenses with corresponding camera bodies may be slidably arranged on a common base.

In addition to or in lieu of means for adjustment of the parameter T, the camera shown in FIGS. 12 and 13 may also be constructed to permit variation of the focal length $f$. This adjustment would give the photographer added flexibility to control the parallax pursuant to the equations (4) and (5) above. As an example, each of the lenses 100–108 may be made interchangeable with other lenses of different focal length. All of the lenses used in taking a picture, however, preferably will have the same focal length.

Of course, it is also possible to employ a number of separate cameras, instead of a single camera housing a plurality of lenses. The separate cameras may be commonly supported or they may have individual supports. Likewise, the distance T in the plural lens camera or among the plural cameras may be kept the same, and control of the parallax values effected by proper selection of $a$, $k$ and $b$.

Instead of using one camera with a plurality of lenses or a plurality of separate cameras, it is possible to employ a conventional single-lens camera and to move this camera sequentially between a number of predetermined positions, spaced equidistantly over the distance T, at which separate photographs are taken. The step-wise movement of the camera is most easily accomplished by means of a camera support assembly according to a second representative embodiment of the present invention. This support assembly is provided with a slide and has a number of scales to guide the photographer in the movement of the camera. The movements imparted to create the photographic sequence of the scene are carried out over a described length of the requisite scale, the steps on each scale being equal so that they are equal to the scale modulus or a multiple of the scale modulus. For most scales, the number of negatives provided for is eleven so that the scale modulus, or step distance, is the prescribed length T divided by ten. A position stop mechanism is provided to allow ease of scale selection and permit accuracy of the camera stepping position.

Figure 14:
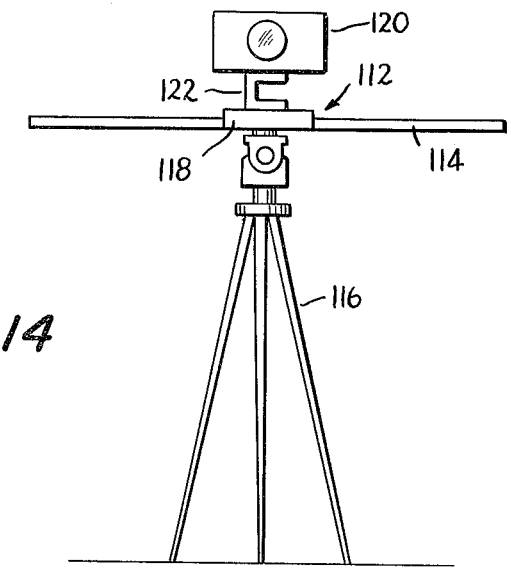
FIG. 14 is an elevational view of a camera support assembly according to a second representative embodiment of the present invention.
Figure 15:
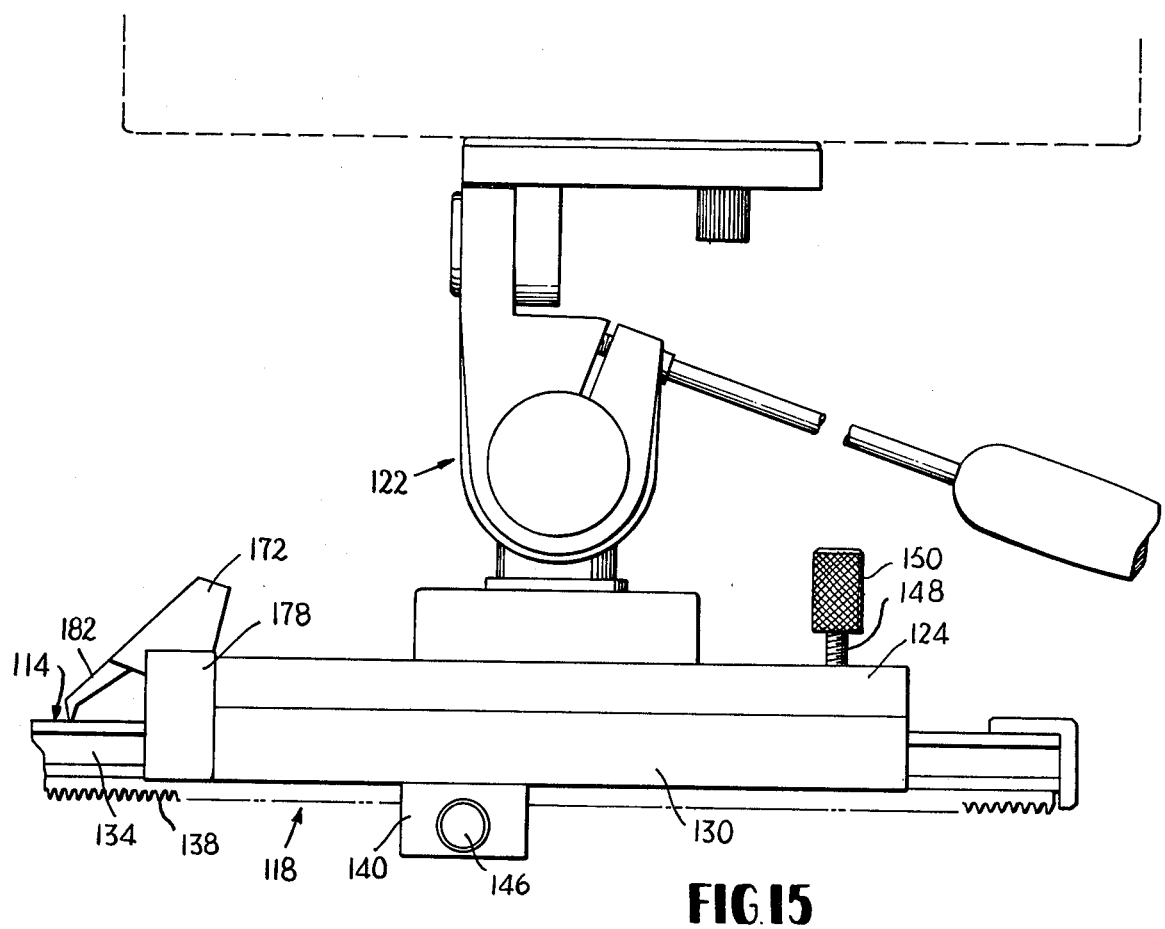
FIG. 15 is a rear elevational view of the camera support assembly illustrated in FIG. 14.
Figure 16:
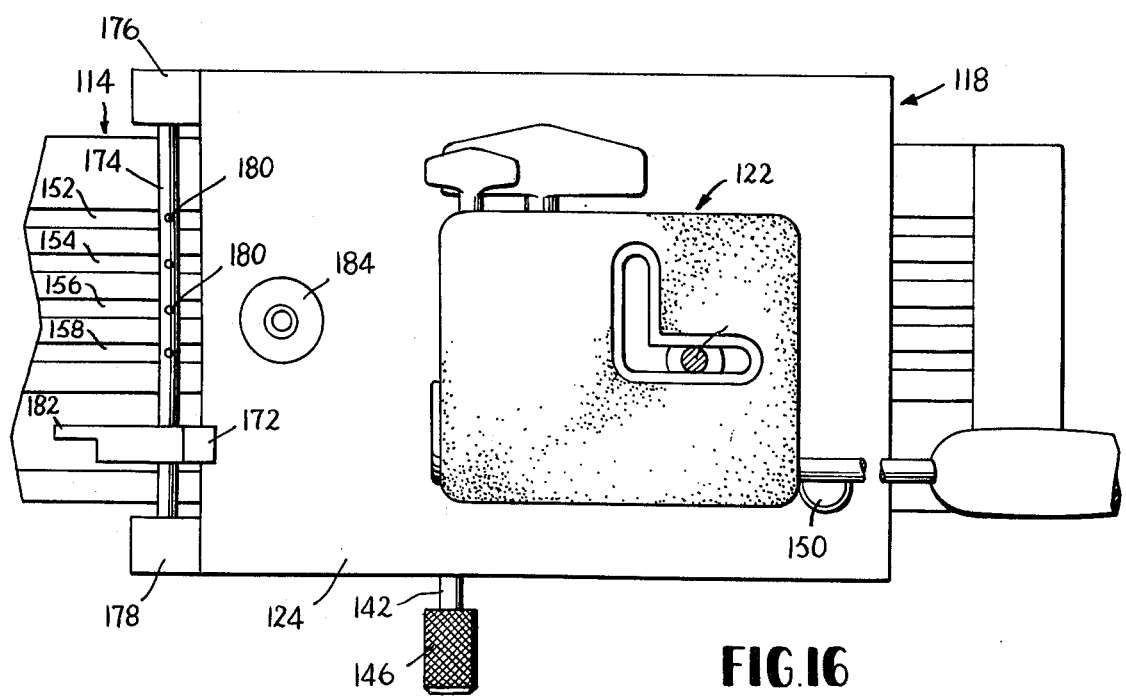
FIG. 16 is a top plan view of the camera support assembly illustrated in FIG. 14.

The camera support assembly according to this embodiment is illustrated in FIGS. 14–19. As shown in FIG. 14 the support assembly, indicated generally by the reference character 112, consists essentially of a base 114 which is rigidly mounted upon a conventional tripod 116. The base 114 supports a slide 118 which may be stepped along the length of the base 114, in a manner hereinafter more particularly described, through discrete and selected distances so that sequential photographs may be taken by the camera 120 of the scene under consideration. The slide 118 carries a conventional universal camera support 122 by means of which the camera 120 may be properly positioned so as to be parallel to the base 114 with its optical axis in a vertical plane perpendicular to the movement of the slide 118. The base 114 itself is arranged in a horizontal plane and, for this purpose, it is provided with a bubble level device 184 (FIG. 16) so that this disposition of the support assembly may be achieved.

Figure 17:
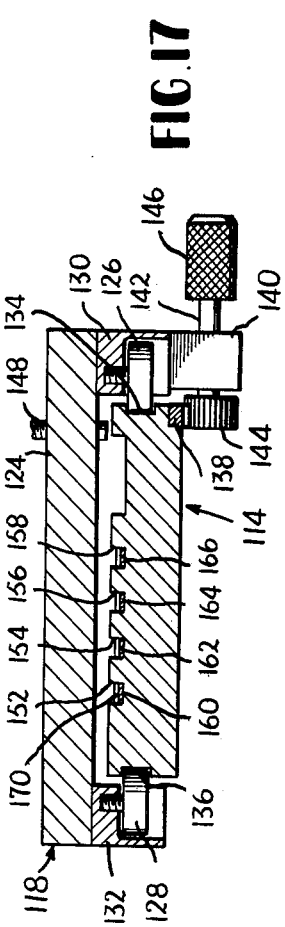
FIG. 17 is a transverse section taken through the camera support assembly illustrated in FIG. 14.

The support assembly 112 is shown in detail in FIGS. 15–19. The slide 118 includes a platform 124 which is disposed with clearance above the support base 114 by means of pairs of ball bearing rollers 126 and 128 (FIG. 17) which are carried by the side rails 130 and 132 secured to the opposite sides of the platform 124 and which engage in the grooves 134 and 136 along the opposite side edges of the support base 114. As is also shown in FIG. 17, a rack member 138 is secured to the underside of the support base 114 and a carrier block 140, secured to the underside of the side rail 130, carries a pinion shaft 142 to which is secured a pinion 144 so that manual manipulation of the knob 146 will traverse the slide 118 longitudinally of the support base 114. A slide locking screw 148 threads through the platform 124 and may be engaged through manipulation of the knob 150 against the upper surface of the base 114 (FIG. 16) releasably to lock the position of the slide.

The upper surface of the support base 114 is provided with a series of slots 152, 154, 156 and 158 within which corresponding scale bearing members 160, 162, 164 and 168 are received in fixed relation thereto, each of which has transverse notches therein such as those indicated by reference character 170 in FIGS. 17 and 18. These notches determine the distances T and the intermediate photographic positions by virtue of cooperation with a pawl member 172 pivotally carried by the cross shaft 174 secured at its opposite ends to the blocks 176 and 178 which, in turn, are affixed to one end of the platform 124, as is shown.

The cross shaft 174 is provided with detents or depressions 180 corresponding with each of the grooves 152–158 and the pawl 172 carries a spring urged ball which tends to center or home in a selected one of the depressions 180 when the tip 182 of the pawl rides into each depression 170 of the selected track. The sides of the transverse depressions preferably are sufficiently steep such that the tip 182 cannot ride out of a depression as the slide is moved to the left. Thus, as the slide is stepped from left to right, the slide may be moved one step and then brought back toward the left until the tip 182 arrests slide movement, thus establishing an accurate position of the slide. The pawl 172 may also be manually lifted to disengage the tip 182 and allow free movement of the slide in both directions. The modulus or spacing between the successive notches 170 in each case determines the total distance T and provides means whereby the camera is positively and accurately positioned in accordance with a particular scale as will be described hereinafter.

Figure 18A:
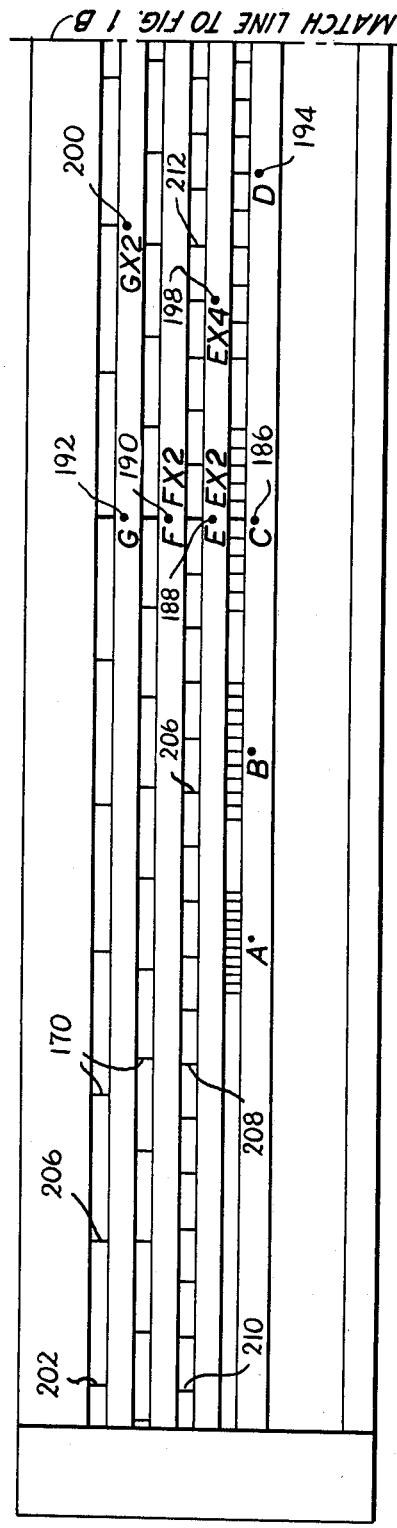
FIGS. 18A and 18B are composite views illustrating the scale layout in one form of the camera support assembly illustrated in FIG. 14.
Figure 18B:
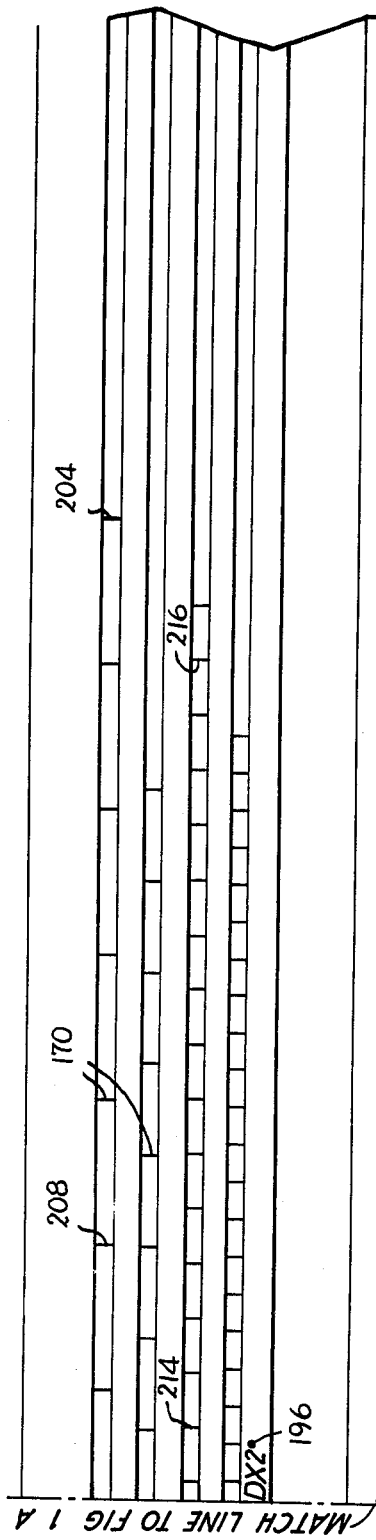

FIG. 18A and 18B illustrate various tracks and scales of the support assembly according to one form of the present invention. As indicated, there are twelve scales, namely the A, B, C, D, Dx2, E, Ex2, Ex4, F, Fx2, G, Gx2 scales, each having a different modulus. In the embodiment shown, the center points for the C, E, F and G scales are aligned as indicated by the dots or markings 186, 188, 190 and 192, the center marking of the D scale is displaced to the right as indicated at 194 and the Dx2 scale center mark is displaced still further to the right as indicated by the reference character 196 and the Ex4 and Gx2 scales respectively have their center marks 198 and 200 also displaced to the right.

For the particular embodiment shown in FIGS. 18A and 18B, each track is provided with plural scales as for example the A, B, C and D scales, each having its center reference point. The scale of smallest modulus is the A scale, the modulus of the B scale is 1 ½ times that of the A scale, that of the C scale is twice the modulus of the A scale, and the modulus of the D scale is three times that of the A scale. The Ex2 and Ex4 scales have moduli respectively twice and 4 times that of the E scale, and so on for the Fx2 and Gx2 scales.

For the scales of larger modulus, the center reference points must be displaced to the right in order to accommodate the total number of exposure positions involved. Thus, for the Gx2 scale which requires nine negatives, the extreme left-hand position is at the scale depression 202 whereas its extreme right-hand position is at the scale depression 204. By contrast, the extreme left-hand position of the G scale which requires eleven exposures is at the scale depression 206 whereas its extreme right-hand position is at the scale depression 208. Similarly, the extreme left-hand positions of the scales E, Ex2 and Ex4, respectively, which require eleven exposures each, are at the scale depressions 206, 208 and 210 whereas their right-hand positions are 212, 214 and 216.

Figures 19A, 19B:
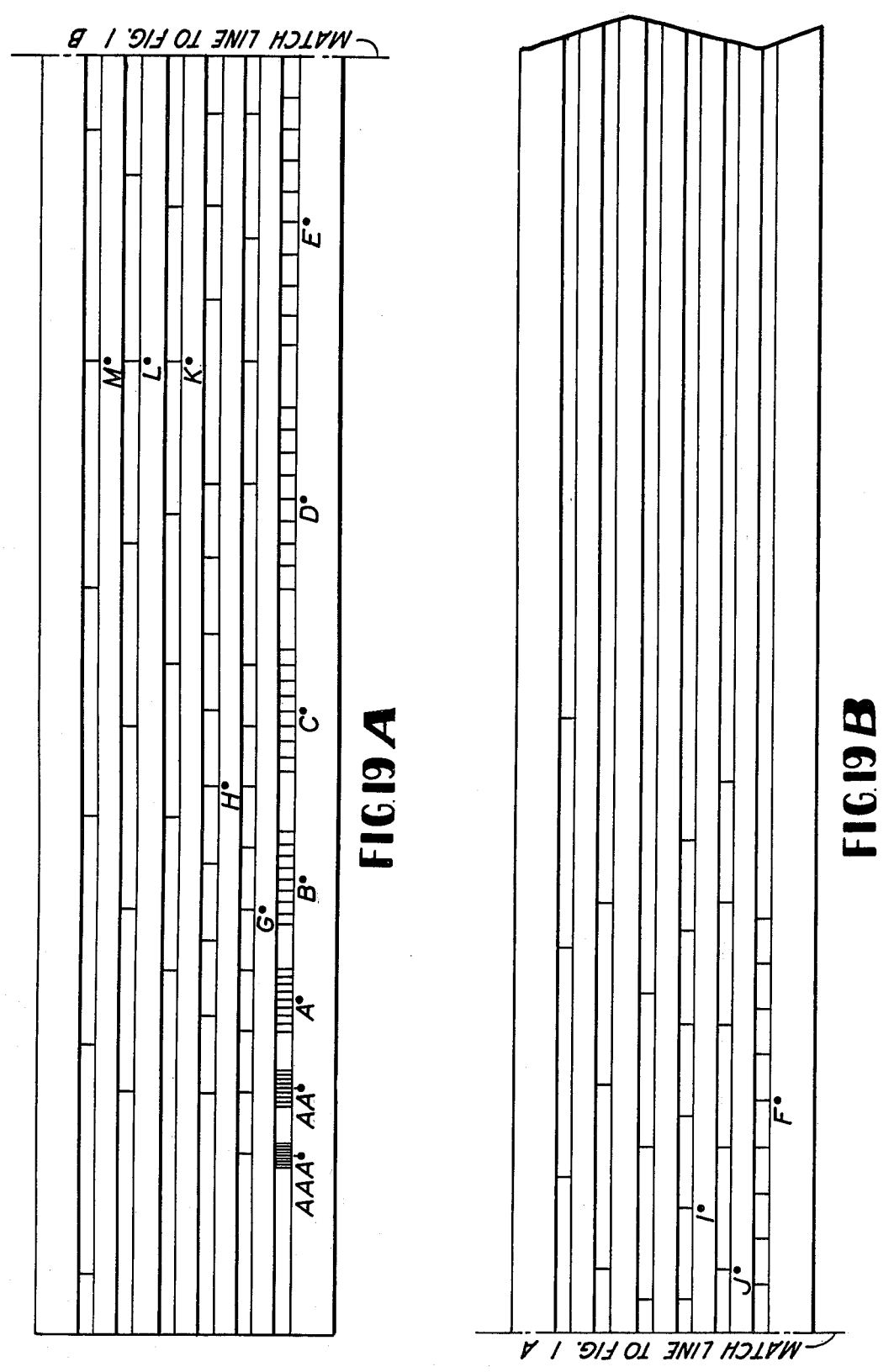

FIGS. 19A and 19B illustrate another form for the sets of scales which may be used. In this case, all of the scales are separated rather than, as is the case with FIGS. 18A and 18B, having some of the scales doubled or trebled by using multiples of the depressions or notches 170. The scales may be of any suitable length, and need not be related to each other by a particular factor or multiple. Also, any suitable number (N) of notches, e.g. nine, may be provided in the scales.

In any event, the total length of any scale (the distance T) is such, when the proper scale for a given object field is selected, as to constrain the parallax value in the stereoscopic picture to fall within the required limits for a high quality picture.

In operation, the photographer, knowing the focal length of the camera used, and size of the original negative and the desired final size and lenticule width of the stereoscopic picture, and having determined the values of $a$, $b$ and $c$, can determine the correct scale to use by solving equation (5) and matching the T value thus determined as closely as possible with the T values of the scales. Alternatively, charts, which are illustrated in Tables I and II, may be developed by routine calculation of the distance T using equation (5) derived above. As has been noted, for all scales other than the scale Gx2, eleven frames are exposed for composition of the stereoscopic picture (nine frames being exposed for the scale Gx2) so that $N = 11$ (or 9) in the equation. The parallax factor $c$ has been chosen in the charts shown in Tables I and II to provide an image shift due to parallax of the width of one lenticule; i.e., the optimum shift in accordance with the principles of the present invention.

Table I

Size of Original = 35mm    Size of Final 3D Picture = 16×20"    Camera's lens = 20mm Parallax factor (c)=1    Lenticule width of Final 3D Pictures = 0.48mm

| T \ b−a / a | 1' | 2' | 3' | 4' | 5' | 6' | 7' | 10' | 15' | 20' | 30' | 50' | 70' | 100' | Infinity |
|---|---|---|---|---|---|---|---|---|---|---|---|---|---|---|---|
| 1' | B | B | A | | | | | | | | | | | | |
| 2' | E | D | D | D | D | D | D | D | D | C | C | C | C | C | C |
| 3' | Ex2 | F | E | E | E | E | E | E | E | D | D | D | D | D | D |
| 4' | Ex2 | Ex2 | F | F | F | Dx2 | Dx2 | E | E | E | E | E | E | E | E |
| 5' | | Fx2 | G | Ex2 | Ex2 | F | F | F | F | Dx2 | Dx2 | Dx2 | Dx2 | Dx2 | Dx2 |
| 6' | | Gx2 | Fx2 | G | G | Ex2 | Ex2 | Ex2 | F | F | F | F | F | F | F |
| 7' | | | Ex4 | Fx2 | Fx2 | G | G | G | Ex2 | F | F | F | F | F | F |
| 10' | | | | | | Gx2 | Gx2 | Ex4 | Fx2 | G | G | G | G | G | G |
| 15' | | | | | | | | | Gx2 | Gx2 | Ex4 | Ex4 | Ex4 | Ex4 | Ex4 |
| 20' | | | | | | | | | | Gx2 | Gx2 | Gx2 | Gx2 | Gx2 | Gx2 |
| 30' | | | | | | | | | | | | | | | |
| 40' | | | | | | | | | | | | | | | |
| 50' | | | | | | | | | | | | | | | |
| 60' | | | | | | | | | | | | | | | |
| 70' | | | | | | | | | | | | | | | |
| 80' | | | | | | | | | | | | | | | |

Table I-continued

| Size of Original = 35mm | | | | Size of Final 3D Picture = 16×20" | | | | | | Camera's lens = 20mm | | | |
|---|---|---|---|---|---|---|---|---|---|---|---|---|---|
| Parallax factor (c)=1 | | | | Lenticule width of Final 3D Pictures = 0.48mm | | | | | | | | | |

| b−a<br>T<br>a | 1' | 2' | 3' | 4' | 5' | 6' | 7' | 10' | 15' | 20' | 30' | 50' | 70' | 100' | Infinity |
|---|---|---|---|---|---|---|---|---|---|---|---|---|---|---|---|
| 100' | | | | | | | | | | | | | | | | b−a = Depth of Field (Distance between foreground & background)
a = Range (Distance from camera to foreground)
T = Scale

Table II

| Size of Original = 35mm | | | | Size of Final 3D Picture = 11 × 14" | | | | | | Camera's lens = 20mm | | | |
|---|---|---|---|---|---|---|---|---|---|---|---|---|---|
| Parallax factor (c) = 1 | | | | Lenticule width of Final 3D Picture = 0.48mm | | | | | | | | | |

| b−a<br>T<br>a | 1' | 2' | 3' | 4' | 5' | 6' | 7' | 10' | 15' | 20' | 30' | 50' | 70' | 100' | Infinity |
|---|---|---|---|---|---|---|---|---|---|---|---|---|---|---|---|
| 1' | C | C | B | | | | | | | | | | | | |
| 2' | D×2 | E | E | D | D | D | D | D | D | D | D | D | D | D | D |
| 3' | G | F | F | D×2 | D×2 | D×2 | E | E | E | E | E | E | E | E | E |
| 4' | E×4 | G | E×2 | E×2 | E×2 | F | F | F | F | D×2 | D×2 | D×2 | D×2 | D×2 | D×2 |
| 5' | | E×4 | F×2 | G | G | G | E×2 | E×2 | E×2 | F | F | F | F | F | F |
| 6' | | G×2 | E×4 | F×2 | F×2 | G | G | G | E×2 | E×2 | E×2 | E×2 | E×2 | E×2 | E×2 |
| 7' | | | G×2 | G×2 | E×4 | E×4 | E×4 | G | G | G | E×2 | E×2 | E×2 | E×2 | E×2 |
| 10' | | | | | G×2 | G×2 | G×2 | E×4 | E×4 | F×2 | E×2 | E×2 | E×2 | E×2 | F×2 |
| 15' | | | | | | | | G×2 | G×2 | G×2 | G×2 | G×2 | G×2 | G×2 | G×2 |
| 20' | | | | | | | | | | | | | | | |
| 30' | | | | | | | | | | | | | | | |
| 40' | | | | | | | | | | | | | | | |
| 50' | | | | | | | | | | | | | | | |
| 60' | | | | | | | | | | | | | | | |
| 70' | | | | | | | | | | | | | | | |
| 80' | | | | | | | | | | | | | | | |
| 100' | | | | | | | | | | | | | | | | b−a = Depth of Field (Distance between foreground & background)
a = Range (Distance from camera to foreground)
T = Scale The technique employed by the photographer is first to select the proper scale to be used after having set up his camera in the proper manner described above. He does this by determining the distances $a$ and $b−a$ in accordance with the procedure exlained hereinabove and choosing the appropriate chart corresponding to the focal length of his camera, the negative size and desired stereoscopic picture size and lenticule width. The camera support slide 118 is then positioned at the appropriate reference point for this scale on the support assembly with the camera directed toward the object field to be photographed and camera's optical axis aligned with the principal axis of the object field. The photographer then steps the camera five steps to the left from the reference point (assuming eleven notches in the scale) and also five steps to the extreme right-hand position checking in both cases that the composition of the picture seen by the camera is as he desires. When the adjustments to the camera have been made for proper angle, composition etc., the camera is returned to the reference position and focused on the key subject matter of the picture. The camera is next moved to the extreme left-hand position for exposing the first frame. Thereafter successive frames are exposed as the camera is stepped to the right to expose all 11 (or nine in the case of the scale Gx2) negatives.

Figure 20:
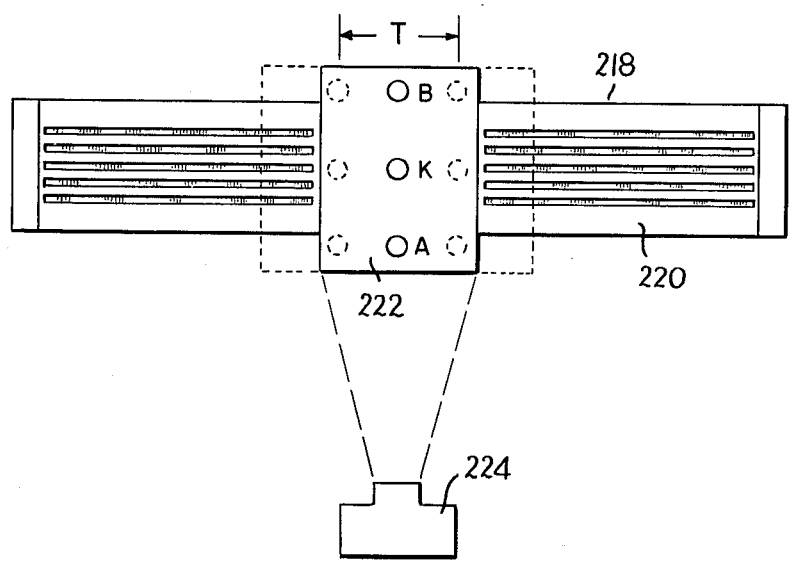
FIG. 20 is a diagrammatic view showing how the camera support assembly illustrated in FIG. 14 may be used as a support for objects to be photographed, according to a further embodiment of the present invention.

FIG. 20 illustrates a third embodiment of the present invention in which the objects to be photographed, rather than the camera, are sequentially moved between a number of predetermined positions at which separate photographs are taken. The step-wise movement of the objects is most easily accomplished by means of a support assembly, indicated generally by the reference character 218, similar or identical to the camera support assembly described above. The object support assembly thus includes a base 220 and a slide 222 which may be stepped along the base in a manner identical to the slide 118 in the camera support assembly described above. The slide 222 may be constructed somewhat differently from the slide 118, however, to permit attachment of the object or objects to be photographed with foreground, key subject matter and background elements at appropriate positions A, K and B. When a single, large object is attached to the slide 222 and photographed, the position K is located somewhere near its center, so that the final stereoscopic picture will convey the impression of depth.

It will thus be appreciated that the support assembly 218 would be particularly useful in studio photography and certain types of micro-photography where the depth of field $(b−a)$ of the object field and the distance to the camera 224 are relatively short.

In operation, the object support assembly 218 serves to control the parallax in the final stereoscopic picture in a manner identical to that of the camera support assembly 112. In this case, the slide 222 is moved stepwise between a left-most position and a right-most position, these positions being spaced such that the points A, K and B are moved through a distance T. The value of T, or more particularly the scale which is used in the movement of the slide, may be determined from charts, similar to the representative examples shown in Tables I and II, prepared in accordance with the principles of the present invention.

In each of the embodiments thus far described, the path of the vantage points with respect to the object field has been linear and transverse to the principal axis of the object field. In certain cases, it is desirable to make an image record from vantage points along an arc of a circle having position K at its center. This arrangement permits the optical axis of the camera to remain directed at position K at each vantage point so that the image of the element at position K will always be focused at the same place on the camera negative.

Figures 21, 22:
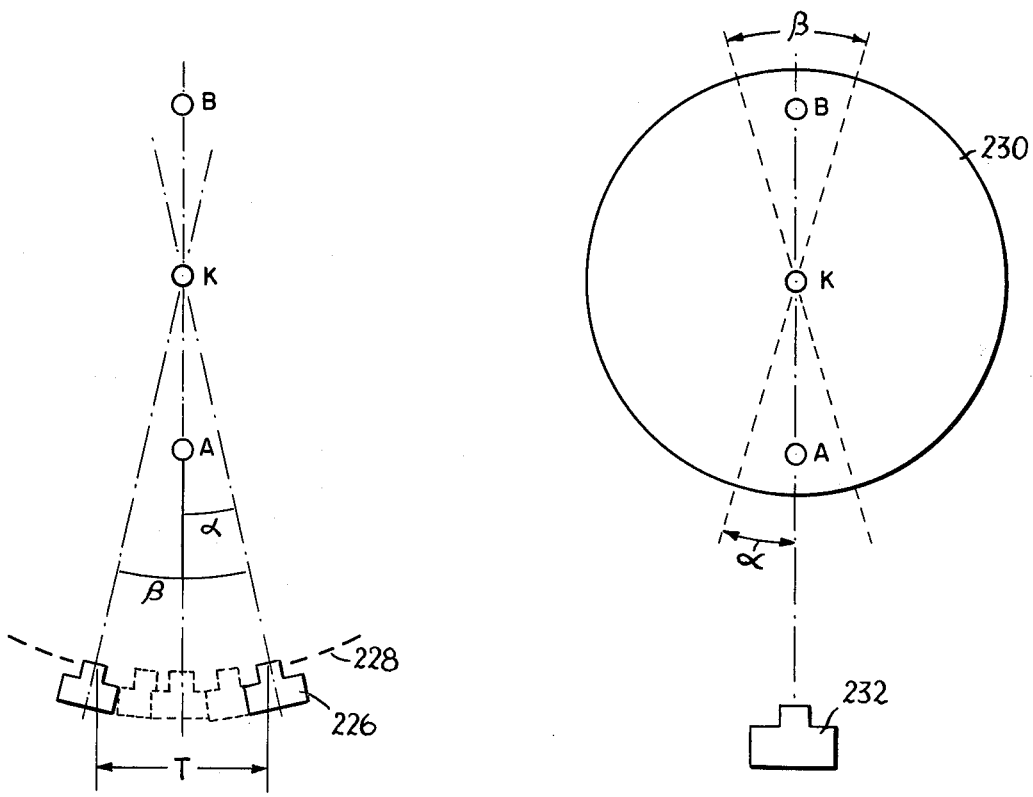
FIG. 21 is a diagrammatic view showing how a camera may be moved in the arc of a circle in accordance with a still further embodiment of the present invention.
FIG. 22 is a diagrammatic view showing how objects to be photographed may be rotated on a turntable in accordance with a still further embodiment of the present invention.

FIG. 21 illustrates an arrangement whereby a camera 226 is moved along the arc 228 of a circle having position K at its center. For small angles of arc, the equations (4) and (5) yield a close approximation of the distance T. If the distance from the camera objective to the key subject matter (thus, the radius of the circle of arc 228) is $k$, then:

$$\tan \alpha = T/2k;$$

$$\beta = 2\alpha$$

Equation (3) may still be used to determine the proper relative distances of the elements at positions A, K and B.

The relative arcuate movement of the camera with respect to the elements at positions A, K and B can also be effected by means of a turn (or tilt) table having the key subject matter element placed at its axis of rotation. FIG. 22 illustrates such a table 230 spaced relative to the camera 232. As will be appreciated from the illustration, the geometry of the arrangement of FIG. 22 is identical to that of FIG. 21 so that the same equations apply and:

$$\tan \alpha = T/2k.$$

The description of the principles, methods and apparatus according to the present invention is now complete. As has been emphasized above it will be understood that these principles, methods and apparatus are generally applicable whenever it is desired to produce a stereoscopic picture of the type enploying a lenticular screen. As has been pointed out, for example, the present invention may be utilized with either the so-called direct or the indirect method of producing a stereoscopic picture. Added flexibility is provided when the indirect method is used because the number (N) of vantage points may be controlled during the composing process. The present invention may also be utilized in all types of photographic conditions, such as close-up or telescopic photography, macrophotography, microphotography or X-ray photography. For X-ray photography and electron microscopy it may be desirable to move the source of radiation and the image receiving device (which is used to produce an image on an image intensifier screen) in addition to movement of the camera, as described above. In addition, since there are not great variations in depth with this type of photography, the distance T between left-most and right-most vantage points required to obtain the optimum parallax value can be fixed so that the angle of view of the image taking (direct method) or image composing (indirect method) lenticular screen will be the same as the angle of the shifting of the camera. It will be understood, however, that the principles, methods and apparatus according to the present invention remain applicable to these situations as well.

It will also be understood that the preferred embodiments of the present invention are susceptible to various changes, modifications, variations and adaptations as will occur to those skilled in the art. Accordingly, all such changes, modifications, variations and adaptations are intended to be included within the spirit and scope of the following claims.

We claim:

1. The method of producing a stereoscopic picture which comprises the steps of:
    a. sequentially photographing a scene with a single camera at a series of substantially equidistantly spaced points lying in a plane parallel to the object plane of the scene;
    b. composing a stereoscopic picture from the negatives obtained in step (a) by means of a lenticular composing screen of lenticule width W; and
    c. controlling the spacing between the points of step (a) in accordance with a selected one of a finite number possible spacings, which selected one establishes a maximum total parallax value ($X_{T''}$) during the composition of step (b) which lies with a predetermined range of multiples of said lenticule width W.

2. The method of claim 1 wherein:
the stereoscopic picture includes a key subject matter element image in the plane of the picture and only one of a nearest foreground element and a farthest background element image; and
said maximum total parallax value ($X_{T''}$) is within the range determined by $cW(N-1)$, where $c$ is within the range of from substantially 1.0 to substantially 5.0.

3. The method of claim 1 wherein:
the stereoscopic picture includes a key subject matter element image in the plane thereof, a nearest foreground element image and a farthest background element image; and
said maximum total parallax value ($X_{T''}$) is within the range determined by $2cW(N-1)$, where $c$ is within the range of from substantially 1.0 to substantially 5.0.

4. The method of claim 1 wherein:
the stereoscopic picture includes a key subject matter element image in the plane thereof and at least one of a nearest foregrouond element image and a farthest background element image;
the lenticule width W is not substantially greater than 5.0 mils; and
the parallax value between said key subject matter element image and said at least one image is within the range determined by $cW(N-1)$, where $c$ is within the range of from substantially 1.0 to substantially 10.0.

5. A method of obtaining an image record of a spatial object field that is useful in producing a stereoscopic picture of the type incorporating a viewing lenticular screen of lenticule width W, the stereoscopic picture to include a key subject matter element image in the plane of the picture and at least one of a foreground element image seemingly in front of the plane of the picture and a background element image seemingly behind the plane of the picture, comprising the steps of:
    photographically recording an overall image of the object field through a lens of focal length ($f$) from a plurality (N) of different relative vantage points aligned in a path extending generally transversely of, and in generally uniform spaced relation to, the object field; and controlling at least one of (1) said focal length ($f$), (2) the distance between adjacent ones of said plurality (N) of vantage points, (3) the enlargement ratio (R) between the photographic record of said object field and the stereoscopic picture, (4) the distance ($a$) from the path of the vantage points to the nearest foreground element of the object field, (5) the distance ($b$) from the path of the vantage points to the farthest background element of the object field, and (6) the distance ($k$) from the path of the vantage points to the key subject matter element of the object field, so as to maintain the change between adjacent vantage points in the parallax value between the image of the key subject matter element and the image of said at least one element, as recorded at each of said adjacent vantage points, within a predetermined range of multiples of W/R.

6. The method of claim 5 wherein the change in parallax value between adjacent vantage points is maintained within the range determined by $cW/R$, where $c$ is within the range of from substantially 1.0 to substantially 5.0.

7. The method of claim 5 wherein:
W is not substantially greater than 5.0 mils; and
the change in parallax value between adjacent vantage points is maintained within the range determined by $cW/R$ where $c$ is within the range of from substantially 1.0 to substantially 10.0.

8. The method of claim 5 wherein the total of (1) the parallax value between the key subject matter element image and said at least one element image recorded at one endmost vantage point in said path and (2) the parallax value between the key subject matter element image and said at least one element image recorded at the other endmost vantage point in said path is within the range determined by $(cW/R)(N-1)$, where $c$ is within the range of from substantially 1.0 to substantially 5.0.

9. The method of claim 5 wherein the (N) vantage points are located relative to the object field such that the parallax value between the key subject matter element image and said at least one element image recorded at one endmost vantage point is substantially equal to the corresponding parallax value at the other endmost vantage point.

10. The method of claim 5 wherein the parallax value between the key subject matter element image and said at least one element image, as recorded at each of the endmost vantage points, is within the range determined by $(cW/R)(N-1)$, where $c$ is within the range of from substantially 1.0 to substantially 5.0.

11. The method of claim 5 wherein:
W is not substantially greater than 5.0 mils; and
the parallax value between the key subject matter element image and said at least one element image, as recorded at each of the endmost vantage points, is within the range determined by $(cW/R)(N-1)$, where $c$ is within the range of from substantially 1.0 to substantially 10.0.

12. The method of claim 5 wherein:
the stereoscopic picture is to include both a nearest foreground element image and a farthest background element image; and
the distances ($k$), ($a$) and ($b$) are selected such that the parallax value between the key subject matter element image and the nearest foreground element image recorded at each of said vantage points is substantially equal to the parallax value between the key subject matter element image and the farthest background element image recorded at the vantage point.

13. The method of claim 12 wherein the distances ($k$), ($a$) and ($b$) are selected according to the relationship:

$$\frac{k}{a} + \frac{k}{b} = 2 .$$

14. The method of claim 5 wherein:
the stereoscopic picture is to include both a nearest foreground element image and a farthest background element image; and
the change in the parallax value between the key subject matter element image and the nearest foreground element image and the change in the parallax value between the key subject matter element image and the farthest background element image, as recorded at each of said adjacent vantage points, are each within the range determined by $(cW/R)$, where $c$ is within the range of from substantially 1.0 to substantially 5.0.

15. The method of claim 5 wherein:
the stereoscopic picture is to contain both a nearest foreground element image and a farthest background element image;
W is not substantially greater than 5.0 mils; and
the change in the parallax value between the key subject matter element image and the nearest foreground element image and the change in the parallax value between the key subject matter element image and the farthest background element image, as recorded at each of said adjacent points, are each within the range determined by $(cW/R)$, where $c$ is within the range of from substantially 1.0 to substantially 10.0.

16. A method of obtaining an image record of a spatial object field for composing a stereoscopic picture of the type incorporating a viewing lenticular screen of lenticule width W, comprising the steps of:

photographing the object field through a lens of focal length ($f$) from a plurality (N) of equidistantly-spaced vantage points aligned in a path extending generally transversely of, and in substantially uniform spaced relation to, the object field; and selecting the distance (T) between the endmost vantage points as a function of W so as to maintain the total ($X_{T'}$) of (1) the parallax value between the image of the element of the object field nearest to the path of the vantage points and the image of the element of the object field farthest from the path of the vantage points recorded at one endmost vantage point and (2) the parallax value between the image of said nearest object field element and the image of said farthest object field element recorded at the other end-most vantage point within a predetermined range of multiples of W.

17. The method of claim 16 wherein T is determined substantially in accordance with the relationship:

$$T = \frac{X_{T'}}{f} \cdot \frac{ab}{(b-a)} .$$

18. The method of claim 17 wherein
said total parallax value ($X_T'$) is maintained within the range determined by $(2c/R)W(N-1)$, where $c$ is within the range of from substantially 1.0 to substantially 5.0.

19. The method of claim 17 wherein said (N) vantage points are located relative to the object field such that the respective parallax values between the nearest element image and the farthest element image recorded at said endmost two vantage points are substantially equal.

20. The method of claim 17 wherein:
W is not substantially greater than 5.0 mils; and
said total parallax value ($X_T'$), is within the range determined by $(2c/R)W(N-1)$, where $c$ is within the range of from substantially 1.0 to substantially 10.0.

21. The method of claim 17 wherein:
the stereoscopic picture is to include a key subject matter element image located in the plane of the picture, and said nearest foreground element image is seemingly to be in front of the plane of the picture and said farthest background element image is seemingly to be behind the plane of the picture; and
the distance ($a$), ($k$) and ($b$) are selected such that the parallax value between the key subject matter element image and the nearest foreground element image recorded at each vantage point is substantially equal to the parallax value between the key subject matter element image and the farthest background element image recorded at the same vantage point; where $k$ is the distance from the path of the vantage points to the key subject matter element of the object field, $a$ is the distance from the path of the vantage points to the nearest foreground element of the object field, and $b$ is the distance from the path of the vantage points to the farthest background element of the object field.

22. A method of producing a stereographic picture of a spatial object field of the type incorporating a viewing lenticular screen, the picture having the image of a key subject matter element of the object field in the plane thereof and at least one of an image of a foreground element of the object field and an image of a background element of the object field, comprising the steps of:
obtaining a plurality (N) of negatives by photographing the object field through a lens of focal length ($f$) from a corresponding plurality (N) of different relative vantage points aligned in a path extending generally transversely of, and in generally uniform spaced relation to, the object field;
exposing a photosensitive surface by projecting the object field image on each negative through a lenticular screen of lenticule width W with the projected image from each negative of the key subject matter element of the object field in registry with a reference point, the lenticular screen being positioned in overlying relation to the photosensitive surface such that the photosensitive surface is substantially at the focal plane of the lenticular screen; and
controlling at least one of (1) said focal length ($f$), (2) the distance between adjacent ones of said plurality (N) of vantage points, (3) the enlargement ratio (R) between the negatives and said photosensitive surface, (4) the distance ($a$) from the path of the vantage points to the nearest foreground element of the object field, (5) the distance ($b$) from the path of the vantage points to the farthest background element of the object field, (6) the distance ($k$) from the path of the vantage points to the key subject matter element of the object field, (7) the number of said plurality (N) of negatives employed in exposing the photosensitive surface, and (8) the lenticule width W, so as to maintain the change between adjacent vantage points in the parallax value between the image of the key subject matter element and the image of said at least one element, as projected through said lenticular screen from the negative obtained at each of said adjacent vantage points, within a predetermined range of multiples of W.

23. The method of claim 22 wherein the change in said parallax value between adjacent vantage points is maintained within the range determined by $cW$, where $c$ is within the range of from substantially 1.0 to substantially 5.0.

24. The method of claim 22 wherein:
W is not substantially greater than 5.0 mils; and the change in said parallax value between adjacent vantage points is maintained within the range determined by $cW$, where $c$ is within the range of from substantially 1.0 to substantially 10.0.

25. The method of claim 22 wherein the (N) vantage points are located relative to the object field such that the parallax value between the key subject matter element image and said at least one element image, as projected through said overlying lenticular screen from the negative obtained at one endmost vantage point, is substantially equal to the parallax value between the key subject matter element image and said at least one element image, as projected through said overlying lenticular screen from the negative obtained at the other endmost vantage point.

26. The method of claim 22 wherein:
the stereoscopic picture is to include both a nearest foreground element image and a farthest background element image; and
the distances ($k$), ($a$) and ($b$) are selected such that the parallax value between the key subject matter element image and the nearest foreground element image, as projected through said overlying lenticular screen from the negative obtained at each vantage point, is substantially equal to the parallax value between the key subject matter element image and the farthest background element image, as projected through said overlying lenticular screen from the same negative.

27. The method of claim 22 wherein the total ($X_T''$) of (1) the parallax value between the key subject matter element image and the nearest foreground element image and (2) the parallax value between the key subject matter element image and the farthest background element image, as projected through said overlying lenticular screen from the negative obtained at each endmost vantage point, is within the range determined by $cW(N-1)$, where $c$ is within the range of from substantially 1.0 to substantially 5.0.

28. The method of claim 22 wherein:
W is not substantially greater than 5.0 mils; and
the total ($X_T''$) of (1) the parallax value between the key subject matter element image and the nearest foreground element image and (2) the parallax value between the key subject matter element image and the farthest background element image, as projected through said overlying lenticular screen from the negative obtained at each endmost vantage point, is within the range determined by $cW(N-1)$, where $c$ is within the range of from substantially 1.0 to substantially 10.0.

29. The method of claim 26 wherein the distances $k$, $a$ and $b$ are selected according to the relationship:

$$\frac{k}{a} + \frac{k}{b} = 2.$$

30. The method of claim 22 wherein:
the stereoscopic picture is to include both a nearest foreground element image and a farthest background element image; and
the change in the parallax value between the key subject matter element image and the nearest foreground element image and the change in the parallax value between the key subject matter element image and the farthest background element image, as recorded at each of said adjacent vantage points, are each within the range determined by $cW$, where $c$ is within the range of from substantially 1.0 to substantially 5.0.

31. The method of claim 22 wherein:
the stereoscopic picture is to contain both a nearest foreground element image and a farthest background element image;
W is not substantially greater than 5.0 mils; and
the change in the parallax value between the key subject matter element image and the nearest foreground element image and the change in the parallax value between the key subject matter element image and the farthest background element image, as recorded at each of said adjacent vantage points, are each within the range of determined by $cW$, where $c$ is within the range of from substantially 1.0 to substantially 10.0.

* * * * *

UNITED STATES PATENT AND TRADEMARK OFFICE
CERTIFICATE OF CORRECTION

PATENT NO. : 3,960,563
DATED : June 1, 1976
INVENTOR(S) : Allen Kwok Wah Lo and Jerry Curtis Nims It is certified that error appears in the above-identified patent and that said Letters Patent are hereby corrected as shown below:

Abstract, line 20, "the valve of" should read -- the value of --.
Col. 1, line 40, "negative if the" should read --negative (if the--;
Col. 11, line 6, "Allen K. L." should read --Allen K. Lo--;
Col. 13, line 63, "iX$_{BK}$'" should read --X$_{BK}$'--;
Col. 15, lines 47-49, delete "the lenticular screen divides the continuously moving image of";

Col. 17, line 27, "X$_T$," should read --X$_T$'--;
Col. 17, line 56, "factor";" should read --factor",--;
Col. 18, line 1, "point arranged" should read --point is arranged--;
Col. 18, line 18, "e = kf/k-f" should read -- $e = \frac{kf}{k-f}$ --;
Col. 18, line 31, "X$_{KA}$" should read --X$_{KA}$'--;
Col. 18, line 44, "X$_R$" should read --X$_R$'--;
Col. 18, line 58, "k/k-f" should read -- $\frac{k}{k-f}$ --;
Col. 19, line 18, "desired" should read --desires--;
Col. 20, lines 44-46, delete "small appearance of a compound stereoscipic picture wherein the";
Col. 25, line 41, "procedure exlained" should read --procedure explained--;

UNITED STATES PATENT OFFICE
CERTIFICATE OF CORRECTION

Patent No. 3,960,563     Dated June 1, 1976

Inventor(s) Allen Kwok Wah Lo and Jerry Curtis Nims

It is certified that error appears in the above-identified patent and that said Letters Patent are hereby corrected as shown below:

Column 28, line 47, "foregrouond" should read -- foreground --.

Signed and Sealed this

Eighth Day of August 1978

[SEAL]

Attest:

RUTH C. MASON
*Attesting Officer*

DONALD W. BANNER
*Commissioner of Patents and Trademarks*